United States Patent
Chang et al.

(10) Patent No.: US 10,346,870 B1
(45) Date of Patent: Jul. 9, 2019

(54) DYNAMIC PROMOTION ANALYTICS

(71) Applicant: Groupon, Inc., Chicago, IL (US)

(72) Inventors: Kevin Chang, Mountain View, CA (US); David Thacker, Burlingame, CA (US); Paul Gauthier, San Mateo, CA (US); Amit Aggarwal, Sunnyvale, CA (US)

(73) Assignee: GROUPON, INC., Chicago, IL (US)

( * ) Notice: Subject to any disclaimer, the term of this patent is extended or adjusted under 35 U.S.C. 154(b) by 160 days.

(21) Appl. No.: 13/839,360

(22) Filed: Mar. 15, 2013

Related U.S. Application Data

(60) Provisional application No. 61/644,352, filed on May 8, 2012.

(51) Int. Cl.
*G06Q 30/02* (2012.01)

(52) U.S. Cl.
CPC .................. *G06Q 30/0242* (2013.01)

(58) Field of Classification Search
CPC combination set(s) only.
See application file for complete search history.

(56) References Cited

U.S. PATENT DOCUMENTS

| 7,363,246 B1* | 4/2008 | Van Horn | G06Q 30/06 705/12 |
| 8,700,465 B1* | 4/2014 | Liu | G06Q 30/0241 705/14.52 |
| 2006/0143075 A1* | 6/2006 | Carr | G06Q 30/02 705/14.35 |
| 2009/0177540 A1* | 7/2009 | Quatse | G06Q 30/02 705/14.26 |
| 2009/0271266 A1* | 10/2009 | Regmi | G06Q 20/209 705/14.44 |
| 2010/0030720 A1* | 2/2010 | Stephens | G06Q 40/00 706/52 |
| 2011/0055000 A1* | 3/2011 | Zhang | G06N 20/00 705/14.43 |
| 2012/0166267 A1* | 6/2012 | Beatty | G06Q 30/0247 705/14.21 |

OTHER PUBLICATIONS

U.S. Appl. No. 13/839,036, filed Mar. 15, 2013; first named inventor: Chang.
U.S. Appl. No. 13/839,786, filed Mar. 15, 2013; first named inventor: Daly.
U.S. Appl. No. 61/593,262, filed Jan. 31, 2012.

* cited by examiner

Primary Examiner — David J Stoltenberg
Assistant Examiner — Gautam Ubale
(74) Attorney, Agent, or Firm — Alston & Bird LLP

(57) ABSTRACT

A promotion program analytical system and method is disclosed. The promotion program analytical system and method selects a promotion program to offer to a consumer. Selection of the promotion program to present to the consumer includes determining a probability that the consumer will accept the promotion program. The probability of acceptance may be determined based on past performance data of similar promotion programs, and also past performance data on the promotion program itself when it is available.

16 Claims, 14 Drawing Sheets

Table 1

| | 0-2 miles | 2-4 miles | 4-6 miles | 6-8 miles | 8-10 Miles | 10-12 miles | 12-14 miles | 14-16 miles | ⋮ |
|---|---|---|---|---|---|---|---|---|---|
| Promotion Program 1 Dynamic Conversion Rate | 0.15 | 0.3 | N/A | 0.25 | 0.20 | 0.10 | N/A | 0.01 | ⋮ |
| Promotion Program 2 Dynamic Conversion Rate | 0.30 | N/A | 0.12 | 0.05 | N/A | 0.02 | N/A | 0.01 | ⋮ |
| ... | ... | ... | ... | ... | ... | ... | ... | ... | |

FIG. 6

DYNAMIC PROMOTION ANALYTICS

REFERENCE TO RELATED APPLICATION

This application claims the benefit of U.S. Provisional Application No. 61/644,352, filed May 8, 2012, the entirety of which is hereby incorporated by reference herein.

FIELD OF THE INVENTION

The present description relates to offering promotions or deals associated with a product or a service. This description more specifically relates to dynamically analyzing consumer feedback to offers for promotions.

DESCRIPTION OF THE RELATED ART

Merchants typically offer promotions or deals to consumers from time to time in order to generate more business. The promotions offered may be in the form of discounts, deals, rewards or the like. When offering a promotion, a merchant may seek to focus the offer to a specific subset of consumers that may have a higher likelihood of accepting the offered promotion. However, determining which promotional offers will have a higher likelihood of acceptance by a consumer may prove to be difficult.

SUMMARY

A system and method for selecting a promotion program offer to present to a specific consumer is disclosed.

According to an aspect of the present invention, a method of determining whether to present an offer from a promotion program to a consumer is disclosed, where the promotion program includes a promotion program duration during which offers from the promotion program are presented. The method includes: accessing a value of an attribute, the attribute comprising or derived from a consumer attribute or a promotion attribute (such as a promotion attribute, a consumer attribute or an attribute derived from one or both); generating, using a historical predictive model, a historical predicted probability of the consumer's acceptance of the offer, the historical predictive model configured to input the value of the attribute and to output the historical predicted probability, the historic predictive model using performance data of offers from different promotion programs in order to correlate values of the attribute to respective historical predicted acceptances; generating, using a promotion program predictive model, a promotion program predicted probability of the consumer's acceptance of the offer, the promotion program predictive model configured to input the value and to output the promotion program predicted probability, the promotion program predictive model using performance data from previous offers from the promotion program to correlate values of the attribute to respective promotion program predicted acceptances, wherein the promotion program predictive model is dynamically updated multiple times during the promotion program duration; combining the historical predicted probability of acceptance and the promotion program predicted probability of acceptance in order to generate a predicted probability of the consumer's acceptance of the offer; and using the predicted probability of acceptance in order to determine whether to present an offer from the promotion program to the consumer.

According to another aspect of the present invention, a system for determining whether to present an offer from a promotion program to a consumer is disclosed, where the promotion program includes a promotion program duration during which offers from the promotion program are presented. The system includes: one or more memories configured to store one or more consumer profiles, promotion program data of offers relating to the promotion program, and historical data of offers relating to different promotion programs; and a processor in communication with the memory. The processor is configured to: access a value of an attribute, the attribute comprising or derived from a consumer attribute or a promotion attribute; use a historical predictive model in order to generate a historical predicted probability of the consumer's acceptance of the offer, the historical predictive model configured to input the value of the attribute and to output the historical predicted probability, the historic predictive model using performance data of offers from different promotion programs in order to correlate values of the attribute to respective historical predicted acceptances; use a promotion program predictive model to generate a promotion program predicted probability of the consumer's acceptance of the offer, the promotion program predictive model configured to input the value and to output the promotion program predicted probability, the promotion program predictive model using performance data from previous offers from the promotion program to correlate values of the attribute to respective promotion program predicted acceptances; combine the historical predicted probability of acceptance and the promotion program predicted probability of acceptance in order to generate a predicted probability of the consumer's acceptance of the offer; use the predicted probability of acceptance in order to determine whether to present an offer from the promotion program to the consumer; and dynamically update the promotion program predictive model multiple times during the promotion program duration.

Other systems, methods, and features will be, or will become apparent to one with skill in the art upon examination of the following figures and detailed description. It is intended that all such additional systems, methods, and features included within this description, be within the scope of the disclosure, and be protected by the following claims.

BRIEF DESCRIPTION OF THE DRAWINGS

The present invention may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 6 illustrates a table identifying data generated from performance data;

DETAILED DESCRIPTION

Figure 1A:
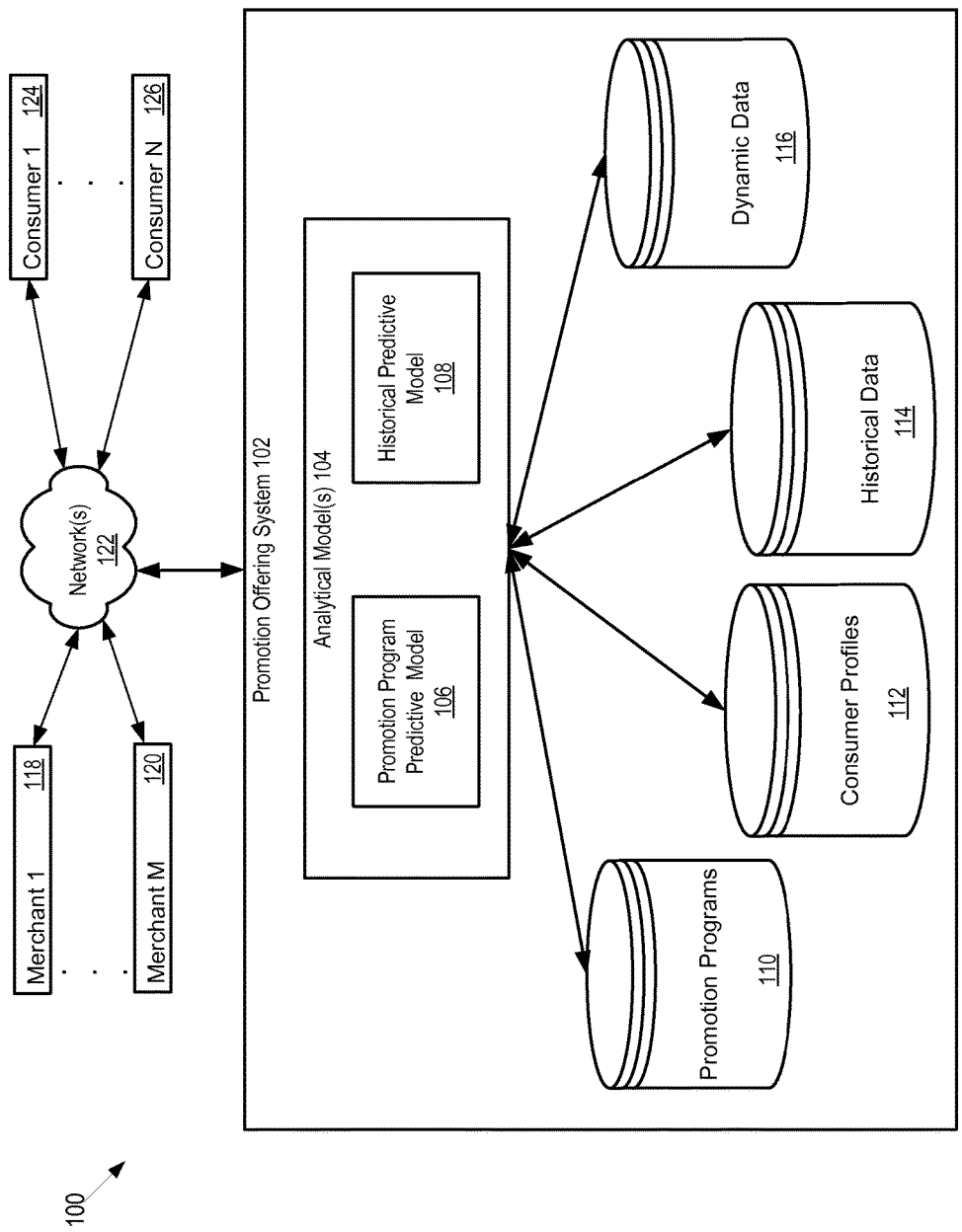
FIG. 1A illustrates a representation of a network and a plurality of devices that interact with the network to achieve deal optimizing, according to the present invention.

The present invention as described herein may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein.

A promotion may include any type of reward, discount, coupon, credit, deal, voucher or the like used toward part (or all) of the purchase of a product or a service. The promotion may be offered as part of a promotion program. The promotion program may include one or more attributes, such as the merchant offering the promotion (e.g., "XYZ coffee shop), the location of the promotion, the amount of the promotion, the category of the promotion (such as a restaurant promotion), the subcategory of the promotion (such as a sushi restaurant), or the like.

When a promotion system has multiple promotion programs, it may be difficult to determine which promotion (or promotions) to offer a specific consumer. In order to assist in the determination, the promotion system may evaluate one, some, or all of the available promotion programs by a metric, and select the promotion program with the best metric. One metric is the probability that a consumer will accept an offer for the promotion program (termed the conversion rate). Another metric is the expected revenue if a consumer is given an offer for the promotion program (e.g., the probability that the consumer will accept the offer for the promotion program multiplied by the revenue generated from acceptance of the offer). The above metrics are merely for illustration purposes. Other metrics are contemplated.

One or more sources of data may be used to evaluate the promotion program for the metric, including data related to the consumer and data related to promotion programs. Data related to the consumer may be organized according to consumer attributes. Attributes of the consumer include, but are not limited to, age, gender, location, or the like.

With regard to data related to promotion programs, one source of data is performance data related to promotion programs other than the promotion program being evaluated. Performance data may include any type of feedback associated with a promotion program, such as a number of offers from the promotion program that were presented to consumers, a number of acceptances of an offer from the promotion program, an indication of interest in the promotion program (e.g., selecting the promotion program for examination on a website or opening an email with an offer for the promotion), or the like. The performance data may be manipulated in one of several different forms, such as a look-up table, a predictive analytical model, one or more distributions, or the like. For example, the performance data may be segmented according to certain attributes, such as attributes of the promotion program (discussed above) and/or attributes of the consumers. Further, attributes based on both the consumer and the promotion program may be generated, such as distance from promotion program (e.g., the distance between the consumer's location, such as the consumer's home, and the place of business of the promotion program) or geographic direction (e.g. north, south, east, west) of the consumer from the location of the promotion program. In this way, the performance data may be segmented according to attributes of the promotion program, attributes of the consumer, and/or attributes based on both the consumer and the promotion program.

Another source of data is performance data. The performance data may relate to promotions programs other than the promotion program being evaluated. Likewise, the performance data may relate to the promotion program being evaluated. The performance data may be organized in one of several ways. One way is in a model that correlates performance data to one or more consumer attributes. For example, performance data for promotions programs other than the promotion program being evaluated may be organized in a historical predictive model. Similarly, performance data for the promotion program being evaluated may be organized in a promotion program predictive model.

The performance data may be derived from the results of offering promotions. For example, the performance data may be organized into conversion rates, which is indicative of the number of purchases of the deal divided by the number of time the deal is offered to users. The conversion rate may take several forms, such as a percentage. As discussed above, the performance data may be correlated based on one or more attributes of the promotion program and/or attributes of the consumers. For example, the performance data may be correlated based on a consumer's age, a consumer's gender, a consumer's distance from the promotion, or the like. As another example, the performance data may include the number of consumers that have received offers for the promotion and/or the number of consumers that have accepted offers for the promotion. The performance data may be manipulated in one of several different forms. In this regard, the predictive models, including the historical predictive model and the promotion program predictive model, may be in one of several forms, such as a look-up table.

The promotion program may be include a promotion program duration, during which offers from the promotion program are presented. The promotion program duration may span a predetermined period of time, such as from a start period to an end period, and may be divided into discrete periods of time, such as a first period during which first period offers are issued, a second period during which second period offers are issued, etc. The predetermined period of time may be a twenty four (24) hour time period, a twelve (12) hour time period, or any other similarly describable time period. For example, a promotion program may be offered for a period of time lasting five days, and the five days may further be segmented into five individual time periods, one day for each of the five days. Performance data may be collected in response to offers for the promotion program sent in one, some or all of the time periods within the five day period of time.

The performance data collected from a previous time period may be used in order to determine whether to offer a promotion to a consumer in a subsequent time period. In this regard, the promotion program predictive model may be updated dynamically multiple times during the promotion program duration. For example, the performance data collected from offers sent in day 1 of the specific promotion program may be used for the promotion program predictive model. More specifically, first period offers sent during the first period may be accepted during the first period, during the second period, etc. Likewise, second period offers sent during the second period may be accepted during the second period, during the third period, etc. The promotion program predictive model may be updated dynamically at discrete points in the promotion program duration and/or in response to receiving an acceptance of one of the offers (such as first period offers, second period offers, etc.). For example, the promotion program predictive model may be updated to account for first period offers accepted during the first period. As another example, the promotion program predictive model may be updated to account for first period offers, outstanding during the first period, and accepted during the second period and/or account for second period offers accepted during the second period. Thus, the promotion program predictive model may be iteratively updated throughout part or all of the promotion program duration for the promotion program. In this regard, the promotion program predictive model may be updated with data prior to using the promotion program predictive model to determine whether to offer promotions from the specific promotion program to a particular consumer in the second period, the third period, etc. An example of using performance data is illustrated in U.S. Provisional Application No. 61/593,262, herein incorporated by reference in its entirety.

As discussed in more detail below, the promotion program predictive model may be used to predict the acceptance of offers by consumers in different periods of the promotion program duration, such as in the second period, in the third period, etc. More specifically, the promotion program predictive model may be accessed in order to determine a conversion rate correlated to a specific attribute. For example, the promotion program predictive model may correlate performance data with the distance attribute (i.e., distance of the consumer from the promotion location). In this regard, during the different periods of the promotion program duration, the promotion program predictive model may output the conversion rate. For example, the promotion program predictive model, using performance data received during the first period, may be accessed to estimate the conversion rate for consumers 0-2 miles. The estimated conversion rate accessed from the promotion program predictive model may be used in determining whether to present an offer in any of the subsequent periods of the promotion program duration, such as determining whether to present an offer in the second period, in the third period, etc.

In one embodiment, the estimated conversion rate accessed is used to determine whether to present the offer in one of the subsequent periods. For example, the promotion program predictive model may output the estimated conversion rate for consumers 0-2 miles, with the estimated conversion rate for consumers 0-2 miles being combined with an output from the historical predictive model. In an alternate embodiment, an adjusted estimated conversion rate (adjusted based on the estimated conversion rate accessed) is used to determine whether to present the offer in one of the subsequent periods. The estimated conversion rate as indicated by the promotion program predictive model is, in effect, a snapshot in time. As discussed above, offers from the promotion program may span across multiple periods of the promotion program duration. Acceptances to offers received in the first period are not indicative of all of the acceptances of first period offers. Rather, first period offers may be accepted during subsequent periods. In this regard, the promotion program predictive model is updated dynamically, as discussed above. Further, the performance data, accessed during one period, may be adjusted in order to reflect estimated acceptances in subsequent periods. For example, the promotion program predictive model may be accessed in the second period to determine the conversion rate, which is based on the acceptances of first period offers received during the first period. The accessed conversion rate is adjusted in order to account for estimated acceptances of the first period offers during later periods.

The adjustment of the estimated conversion rate may be based on several factors. One factor is the price to accept an offer from the promotion program. Typically, the higher the price to accept the offer, the longer it takes for consumers to accept the offer (e.g., a first period offer for a vacation will typically be accepted later than an offer for a restaurant). In this regard, the estimated conversion rate may be multiplied by a correction factor to indicate the likelihood of subsequent acceptances of offers. Another factor is the category and/or subcategory of a promotion program. As discussed above, promotion programs may be categorized by category and/or subcategory. The conversion rate may be adjusted based on the category and/or subcategory in order to indicate the likelihood of subsequent acceptances of offers.

In one embodiment, after the performance data is accessed, the performance data in the promotion program predictive model may be analyzed to determine whether the performance data is insufficient to be relied upon. Determination of sufficiency may be performed in one of several ways, as discussed in detail below. One way is to examine the number of offers that were issued from the promotion program for an attribute or a set of attributes. As discussed above, the performance data may be correlated to a specific attribute (such as age) or set of attributes (such as age and gender) and may comprise a number of offers in addition to the conversion rate. If the number of offers is less than a predetermined number, the performance data may be deemed insufficient. Another way to determine sufficiency of the performance data is to examine the number of acceptances that were received for an attribute or a set of attributes. As discussed above, the performance data may be correlated to a specific attribute (such as age) or set of attributes (such as age and gender) and may comprise a number of acceptance in addition to the conversion rate. If the number of acceptance is less than a predetermined number, the performance data may be deemed insufficient. Other factors are discussed in U.S. application Ser. No. 13/839,036, entitled "Promotion System For Determining and Correcting for Insufficiency of Promotion Data", filed on Mar. 15, 2013, hereby incorporated by reference herein in its entirety.

In one embodiment, in response to determining that the performance data in the promotion program predictive model is insufficient, the performance data in the promotion program predictive model is not used in estimating acceptance of the offer by the consumer. Instead, the estimated acceptance may be based on the historical predictive model.

In an alternate embodiment, in response to determining that the performance data in the promotion program predictive model is insufficient, part or all of the performance data from the promotion program predictive model may still be used in determining an estimated acceptance of the offer by the consumer.

In one embodiment, the performance data in the promotion program predictive model may be analyzed for sufficiency, with a confidence level in the performance data resulting from the analysis. A high confidence level indicates sufficiency in the performance data whereas a low confidence level indicates insufficiency of the data. The confidence level may then be applied to the performance data (e.g., the conversion rate) in order to determine the estimate acceptance of the offer by the consumer. For example, a high confidence level may result in greater weighting of the performance data, so that, when combined with the performance data resulting from historical predictive model, the performance data has a greater effect on the ultimate determination of the estimated acceptance of the offer by the consumer. Conversely, a low confidence level may result in lower weighting of the performance data, so that, when combined with the performance data resulting from historical predictive model, the performance data has a lesser effect (or no effect) on the ultimate determination of the estimated acceptance of the offer by the consumer.

In an alternate embodiment, in response to determining that the performance data in the promotion program predictive model is insufficient, other performance data may be accessed and combined with the performance data deemed insufficient. For example, performance data may be correlated to position in the electronic communication (e.g., a first position in an email correspondence). An example of this is discussed in U.S. application Ser. No. 13/839,786, entitled "Promotion Suppression System", filed on Mar. 15, 2013, incorporated by reference herein in its entirety. In addition, the performance data may be correlated to age (such as 30-39 years old). In the event that the performance data for the offer in the first position is insufficient (or the performance data for the offer in the first position to consumers 30-39 years old is insufficient), other performance data may be accessed and combined with the insufficient performance data. More specifically, performance data for the offer in a position other than the first position (such as the second position, third position, etc.) may be accessed. Likewise, performance data for the offer in a position other than the first position to consumers 30-39 years old may be accessed. The accessed performance data may then be combined with the insufficient performance data in order to increase the reliability of the desired performance data. In the example given, the accessed performance data for the offer in the second position, third position, etc. may be modified by one or more weighting factors in order to combine with the insufficient performance data. The weighting factors may account for a decreased likelihood of a consumer accepting an offer in the second or third position of the electronic communication. In this regard, conversion rates for the offer in the third position of the electronic communication may be increased, reflecting the higher likelihood of acceptance of the offer if the offer had been placed in the first position.

As another example, performance data may be correlated to multiple attributes, such as age (e.g., 30-39) and distance (e.g., 0-2 miles from the promotion location. In the event that the performance data correlated to both attributes is insufficient, the performance data for different subsets of the attributes may be accessed and combined. In particular, performance data may be correlated to three attributes: "A", "B", and "C". In the event that the performance data is deemed insufficient correlated to "A", "B", and "C", different subsets of performance data may be accessed, and combined, including performance data correlated to: "A", "B", "C", "AB", "AC", "BC". Combining of the performance data to the different subsets is described in detail below.

As discussed in more detail below, the promotion offering system 102 as illustrated in FIG. 1A, may initially analyze the performance data for the specific promotion program to determine whether to use the performance data in evaluating whether to send an offer for the specific promotion program. Further, if it is determined to use the performance data in evaluating whether to send an offer for the specific promotion program, the promotion offering system may determine how to use the performance data for the specific promotion program.

In practice, when a specific promotion program is first offered to consumers (i.e. launch day, or at the start time period), the promotion offering system 102 has no performance data from the specific promotion program on which to rely. In such situations, the promotion offering system 102 may still predict the reaction of a particular consumer to an offer for the specific promotion program. In this instance, the promotion offering system 102 may rely on data identifying how similar promotion programs have fared with other consumers sharing similar attributes as the particular consumer, which may include the particular consumer himself, in the past.

In the case where the promotion offering system 102 is configured to determine the probability that a particular male consumer will accept an offer from a specific promotion program that provides a discount at an Italian restaurant, a predictive analytical model may be accessed that is able to generate a probability that the particular male consumer will accept the specific promotion program based on data describing how other male consumers behaved when presented with a similar offer to receive a discount on a meal from an Italian restaurant. The predictive analytical model may access a database containing data identifying a number of male consumers that were presented with offers to receive a discount at an Italian restaurant, and data identifying how many of those male consumers accepted such offers to receive a discount at an Italian restaurant. From this data, the predictive analytical model may generate a predicted conversion rate that identifies the percentage of male consumers that have accepted similar offers to receive a discount at an Italian restaurant given a total number of male consumers that were offered similar discounts at an Italian restaurant. The predicted conversion rate is an indicator of a probability that the particular male consumer will accept the offer to receive a discount at the specific Italian restaurant. A similar predicted conversion rate may be generated for a particular female consumer.

Further, the predictive analytical model may account for other consumer attributes, promotion program attributes, or attributes based on the consumer and the promotion program. For example, the predictive analytical model may account for distance of the consumer from the promotion program (e.g., 0-2 miles, 2-4 miles, etc.). So that in the above example, the predictive analytical model may generate a probability that the particular male consumer will accept the specific promotion program based on data describing how other male consumers 2-4 miles from the location of the specific promotion program behaved when presented with a similar offer to receive a discount on a meal from an Italian restaurant. Therefore, a number of attributes may be considered simultaneously when generating a predicted conversation rate to be used when determining the probability that a consumer will accept an offer from a specific promotion program.

As previously described, in situations where a specific promotion program is still in its start time period for being offered (e.g., first launching day), the promotion offering system 102 may rely on predicted conversion rates when determining the probability that a particular consumer will accept the offer from the specific promotion program. However in subsequent time periods, the promotion offering system 102 may rely on both the predicted conversion rate and on performance data of the specific promotion program from a previous time period.

This performance data of the specific promotion program that is gathered from a previous time period may be more probative in estimating whether consumers will accept offers from the specific promotion program. Such performance data may include data identifying a number of offers from the particular promotion program that were presented to consumers, as well as data identifying a number of offers from the particular promotion program that were accepted by consumers in the previous time period. Performance data may then be accessed by a dynamic analytical model (discussed below) to generate a dynamic conversion rate or other indicator of acceptance of an offer.

During an initial time period, the performance data for a particular promotion program may be collected. Then in a subsequent time period, the dynamic analytical model may access the gathered performance data for the particular promotion program from the previous time period and generate a dynamic conversion rate that is based on the real performance of the particular promotion program. Whereas the predicted conversion rate is based only on the past performance of promotion programs that are categorized as being similar to the particular promotion program, the dynamic conversion rate generated following an initial time period is based on real performance data of the particular promotion program.

Performance data may be organized in one of several ways, such as based on one or more attributes of the consumers that received the offer, based on one or more attributes of the promotion program, based on one or more attributes of the electronic communication, based on the date when the offers were sent, etc. Further, the performance data may be used in one of several ways. One way is to use the performance data in order to calculate a conversion rate regardless of any attribute of the consumer. Another way is to use the performance data to calculate the conversion rate based on one, or both, of attribute(s) of the consumer and attribute(s) of the electronic communication. Example attributes of the consumer may include gender, age, distance from the promotion, and the like. Attributes of the electronic communication include, but are not limited to, position of the promotion in the electronic communication, type of electronic communication (e.g., email, web search download, etc.). In this regard, one example of organization may comprise conversion rate for consumers 0-2 miles from the promotion, where the promotion is listed as the first promotion in the email.

FIG. 1A illustrates an overview for a promotion system 100 configured to offer and accept promotions for promotion programs. The promotion system 100 includes a promotion offering system 102, which communicates via one or more networks 122 with consumers, such as consumer 1 (124) to consumer N (126), and with merchants, such as merchant 1 (118) to merchant M (120). The promotion offering system 102 includes an analytical model 104, which may include one or more analytical models. As illustrated in FIG. 1A, the analytical model 104 is shown to include a promotion program predictive model 106 and a historical predictive model 108. Although FIG. 1A is illustrated to show separate analytical models within the analytical model 104, FIG. 1A is merely provided for illustrative purposes and it is within the scope of the invention to have the functionality of all the analytical models be performed by a same computing machine, or separate computing machines.

The analytical models 104 communicate with multiple databases that are part of the promotion offering system 102 such as a promotion program database 110, consumer profiles database 112, historical data database 114 and dynamic data database 116. Specifically, the historical predictive model 108 and the promotion program predictive model 106 may access the databases 110, 112, 114 and 116 in order to generate information to be used in determining a probability that a consumer will accept an offer from a promotion program, as described in this disclosure.

The promotion program database 110 is responsible for storing data detailing various promotion programs that are available for offer in the promotion offering system 102. In order to input promotion program information into the promotion program database 110, merchants may communicate via the networks 122 with the promotion offering system 102 to input the information detailing the various promotion program offerings.

The consumer profiles database 112 includes profiles for the consumers, consumer 1 (124) to consumer N (126), that are included in the promotion system 100. The information detailed for a consumer stored in the consumer profiles database 112 may include, but is not limited to, name, age, address, occupation, educational background, previously accepted promotion program offerings, previously rejected promotion program offerings, gender and the like. Any one, some or all of the attributes of the consumer may be used by the promotion offering system 102 in determining whether to offer a promotion to a consumer.

The historical data database 114 includes information detailing the past performance of promotion program offerings that have been presented in the promotion program system 102 in previous time periods. The historical data database 114 may include, but is not limited to, a number of offers from a promotion program that were presented to consumers, a number of acceptances of an offer from a promotion program, rates of acceptances of specific promotion programs, attributes of consumers that accepted or rejected specific promotion programs, and the like.

The dynamic data database 116 includes information detailing the past performance of a promotion program offering that is currently active in the promotion offering system 102. So that while a promotion program referenced in the dynamic data database 116 is currently active, the data stored in the dynamic data database 116 pertains to performance data of the active promotion program from a previous time period. The analytical model 104 may access dynamic data database 116 in order to configure promotion program predictive model 106. Likewise, the analytical model 104 may access historical data database 114 in order to configure historical predictive model 108.

Although FIG. 1A has been illustrated to show separate databases 110, 112, 114 and 116, FIG. 1A has been illustrated for demonstrative purposes only, and it is within the scope of the present invention to have the databases 110, 112, 114 and 116 arranged in any combination of one or more memories/storage units.

Figure 1B:
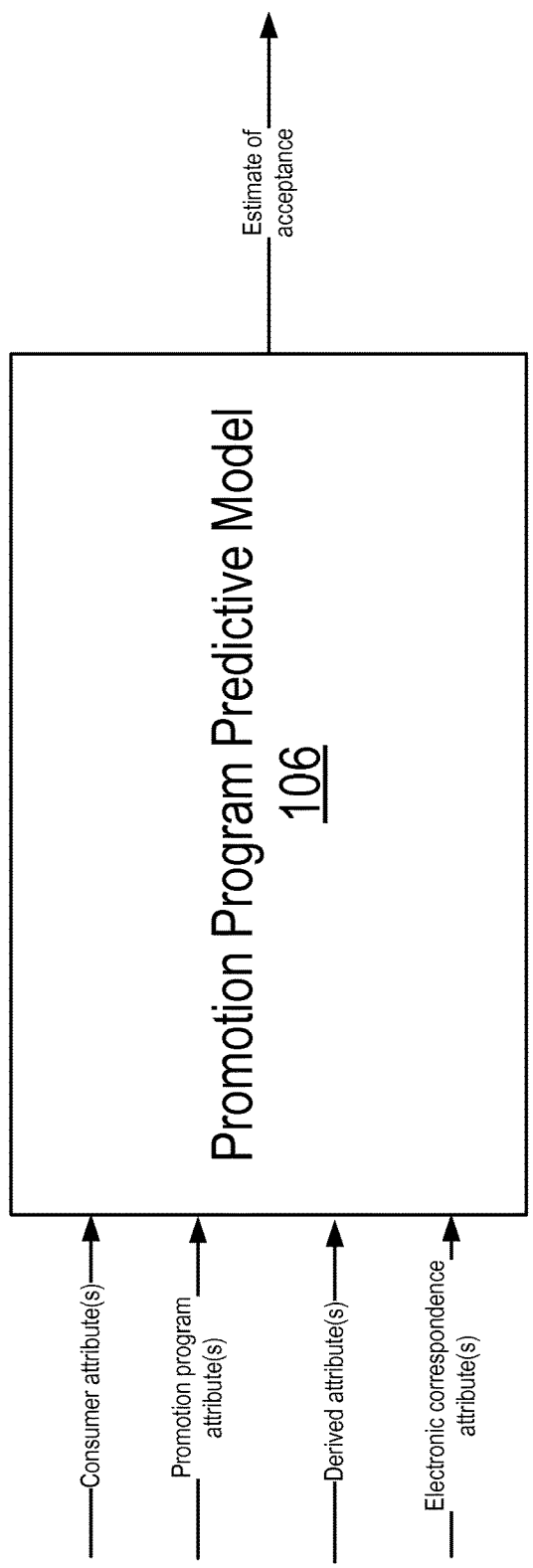
FIG. 1B illustrates a block diagram of the promotion program predictive model.

FIG. 1B illustrates a block diagram of the promotion program predictive model 106. The promotion program predictive model 106 is configured to organize the data from dynamic data database 116, including organizing the data based on one or more consumer attributes, based on one or more promotion program attributes, based on one or more electronic communication attributes, based on the date when the offers were sent, etc. The organized data may take several forms including without limitation: the conversion rate; the number of consumers who have accepted the offer; and/or the number of consumers who have been presented the offer. Further, the promotion program predictive model 106 is configured to receive one or more inputs. As shown in FIG. 1B, the inputs include one or more consumer attributes; one or more electronic communication attributes (such as position of the offer in the email; the date/time when the electronic communication with be sent); one or more promotion program attributes (such as the price of accepting the offer); and one or more derived attributes (such as distance of the consumer from the promotion program, derived from the location attribute for the consumer and the location attribute for the promotion program). Further, the promotion program predictive model 106 is configured to generate one or more outputs. As illustrated in FIG. 1B, an estimate of acceptance (such as conversion rate) may be output based on the performance data. Alternatively, or in addition, the promotion program predictive model 106 may be configured to generate a weighting factor, which may be applied to the estimate of acceptance. As discussed above, a weighting factor may be used depending on the confidence level in the performance data. In still an alternate embodiment, the estimate of acceptance output from the promotion program predictive model 106 may already be weighted. In still an alternate embodiment, in addition to the weighting factor (or instead of the weighting factor), the promotion program predictive model 106 may output an indication of the error associated with the estimate of acceptance, such as an estimate of the error associated with the estimate of acceptance. The estimate for the error associated with the estimate of acceptance for the promotion program predictive model 106 may be based on one or both of the conversion rate and the number of offers, as discussed in U.S. application Ser. No. 13/839,036, entitled "Promotion System for Determining and Correcting for Insufficiency of Promotion Data".

Figure 1C:
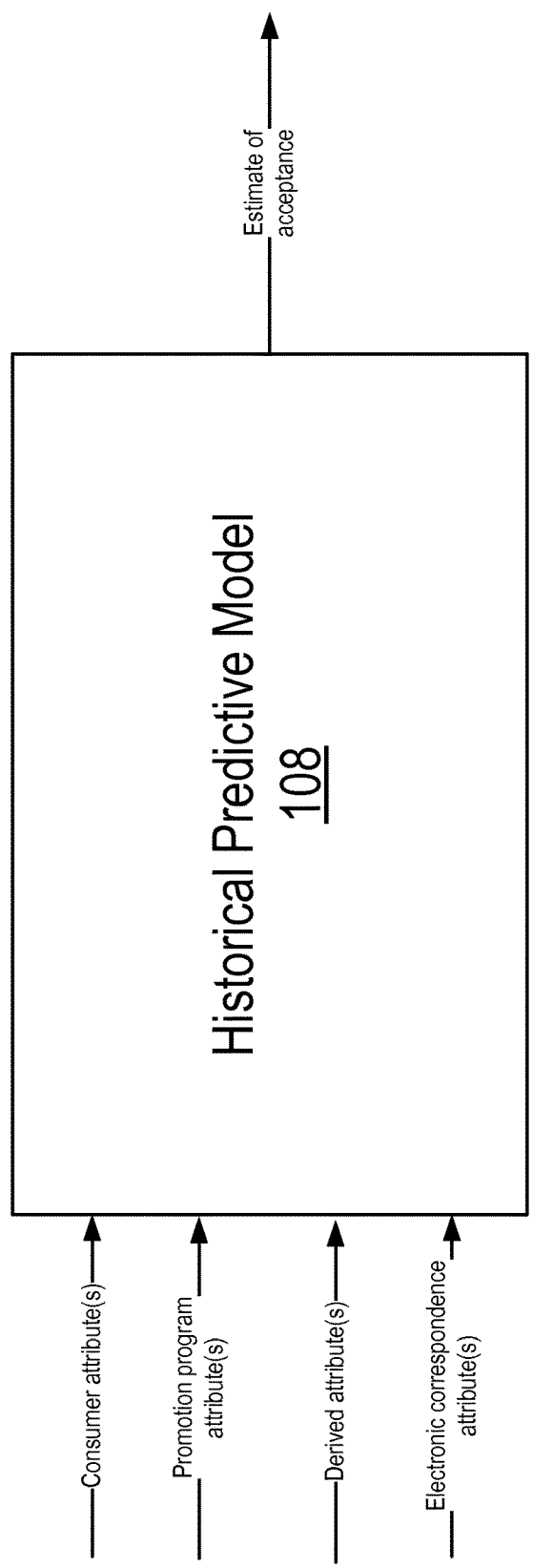
FIG. 1C illustrates a block diagram of the historical predictive model.

FIG. 1C illustrates a block diagram of the historical predictive model 108. The historical predictive model 108 is configured to organize the data from historical data database 114, including organizing the data based on one or more consumer attributes, based on one or more promotion program attributes, based on one or more electronic communication attributes, etc. Similar to the promotion program predictive model 106, the historical predictive model 108 includes inputs of one or more consumer attributes, one or more electronic communication attributes, one or more promotion program attributes, and one or more derived attributes. The historical predictive model 108 is also configured to generate an estimate of acceptance by the consumer. In an alternate embodiment, in addition to the estimate of acceptance, the historical program predictive model 108 may output an indication of the error associated with the estimate of acceptance, such as an estimate of the error associated with the estimate of acceptance. The historical predictive model 108 (with the estimate of acceptance and error associated with the estimate of acceptance) may be characterized in Bayesian statistical terms as a "prior model". The promotion program predictive model 106 (with the estimate of acceptance and error associated with the estimate of acceptance) may be characterized in Bayesian statistical terms as a "predictive data model". In operation, the output of the "prior model" and the output of the "predictive model" may be combined to generate a "posterior" estimate.

Figure 2:
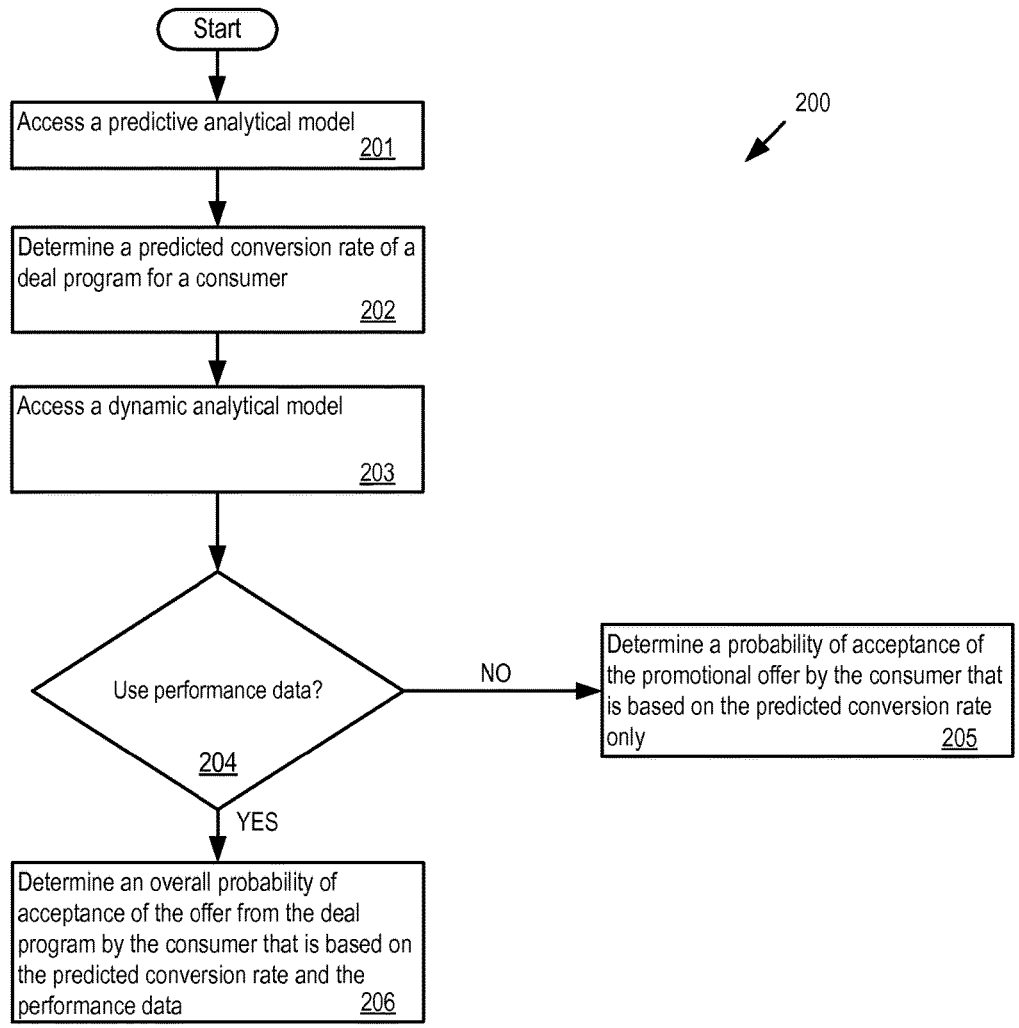
FIG. 2 illustrates a flow chart describing an overview of dynamic analysis of performance data (such as consumer feedback) to offers for promotions.

FIG. 2 illustrates a flow chart 200 of a dynamic analysis of performance data (such as consumer feedback) to offers for promotions. The flow chart 200 is configured to determine a probability of acceptance for an offer from a promotion program by a consumer that is based on attribute information pertaining to the consumer and other data that may be accessed from the databases 110, 112, 114, 116 illustrated in FIG. 1A.

At 201, the historical predictive model 108 is accessed. The historical predictive model 108 may have as inputs one or more attributes of the promotion program, one or more attributes of the consumer, and/or one or more derived attributes (such as a distance between the consumer and the promotion location). As discussed above, the historical predictive model 108 organizes historical performance data from promotion programs in order to generate an output indicative of the likelihood that a consumer will accept a promotion that is offered (such as a predicted conversion rate).

The historical predictive model 108 may be organized into different categories of users correlated with different categories (and subcategories) of promotion types. For example, the historical predictive model 108 may include an aggregation of the historical data from previously-run promotions, organizing features of consumers (such as gender and distance from a deal) with the conversion rates for categories/subcategories of deals. In this way, the historical predictive model 108 may be segmented by consumers (such as males 0-2 miles from the deal, males 2-4 miles from the deal, etc.) and segmented by promotions in different categories/subcategories (such as the category of restaurants, and the subcategories of Italian restaurants, Greek restaurants, etc.). The historical predictive model 108 may therefore provide an aggregation of the data from the previous promotions in order to generate the conversion rates for the consumers in the different categories (such as the conversion rate for users that are males 2-4 miles from a Greek restaurant deal in Chicago). The examples of the categories of users and the categories/subcategories of deals are merely for illustration purposes only. Other categories are contemplated. For example, the categories of users may be subdivided into gender, distance, and age. As another example, the historical predictive model 108 may be subdivided based on price of the promotion program.

In practice, data describing a consumer's attributes stored in the consumer profile database 112 is input to the historical predictive model 108. Likewise, the historical predictive model 108 receives as input one or more promotion program attributes, such as the category of the promotion program, the location of the promotion program, etc. In this way, the data accessed from the promotion program database 110 may identify the specific promotion program under consideration as belonging to a category of "Food and Drink", and further belonging to a sub-category of "Italian Food". The location of the Italian restaurant merchant that is offering the specific promotion program may also be identified from the data stored in the promotion program database 110. Also, the data describing the consumer's attributes may include a location of the consumer, from which the historical predictive model 108 may generate a distance of the consumer from the specific promotion program to be between 2-4 miles.

With the information accessed from the promotion program database 110 and the consumer profile database 112, the historical predictive model 108 may then access the historical data database 114 to obtain data that identifies a statistical indication of the consumers that have accepted similar offers for Italian restaurant promotion programs located 2-4 miles away. Then at 202, a determination based on the data obtained by the historical predictive model 108 may be made to output information related to an indication of acceptance. One example of the output of the historical predictive model 108 is a predicted conversion rate which will be described in further detail below. Another example of an output of the historical predictive model 108 may be a score based on the predicted conversion rate.

At 203, the promotion program predictive model 106 is accessed, which may include (or be based on) the performance data of the particular promotion program gathered from a previous time period. As discussed in more detail below, the promotion program predictive model 106 may take one of several forms.

Figure 3A:
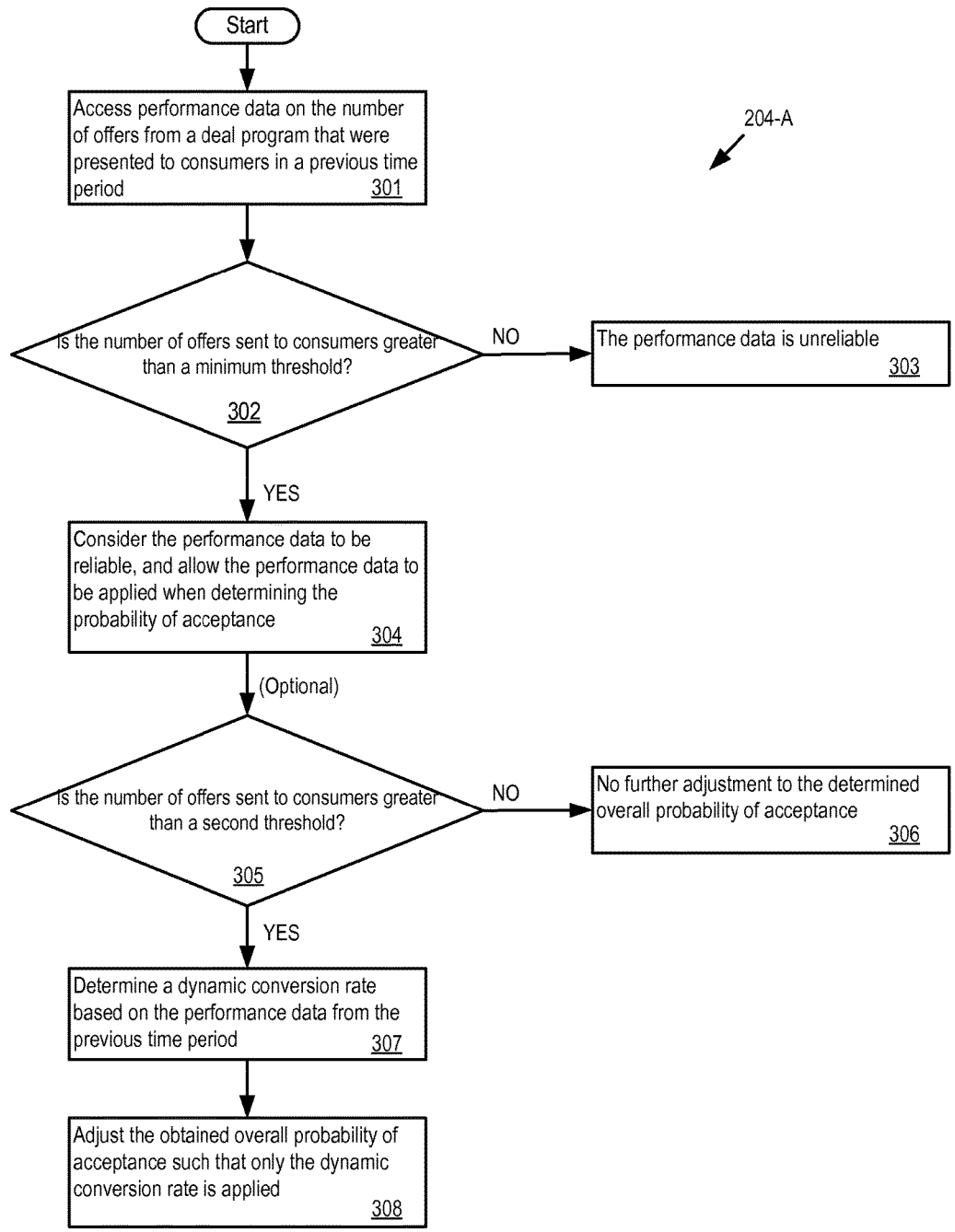
FIG. 3A illustrates an expanded flow chart describing one example to determine whether to use performance data for promotion program analytics.
Figure 3B:
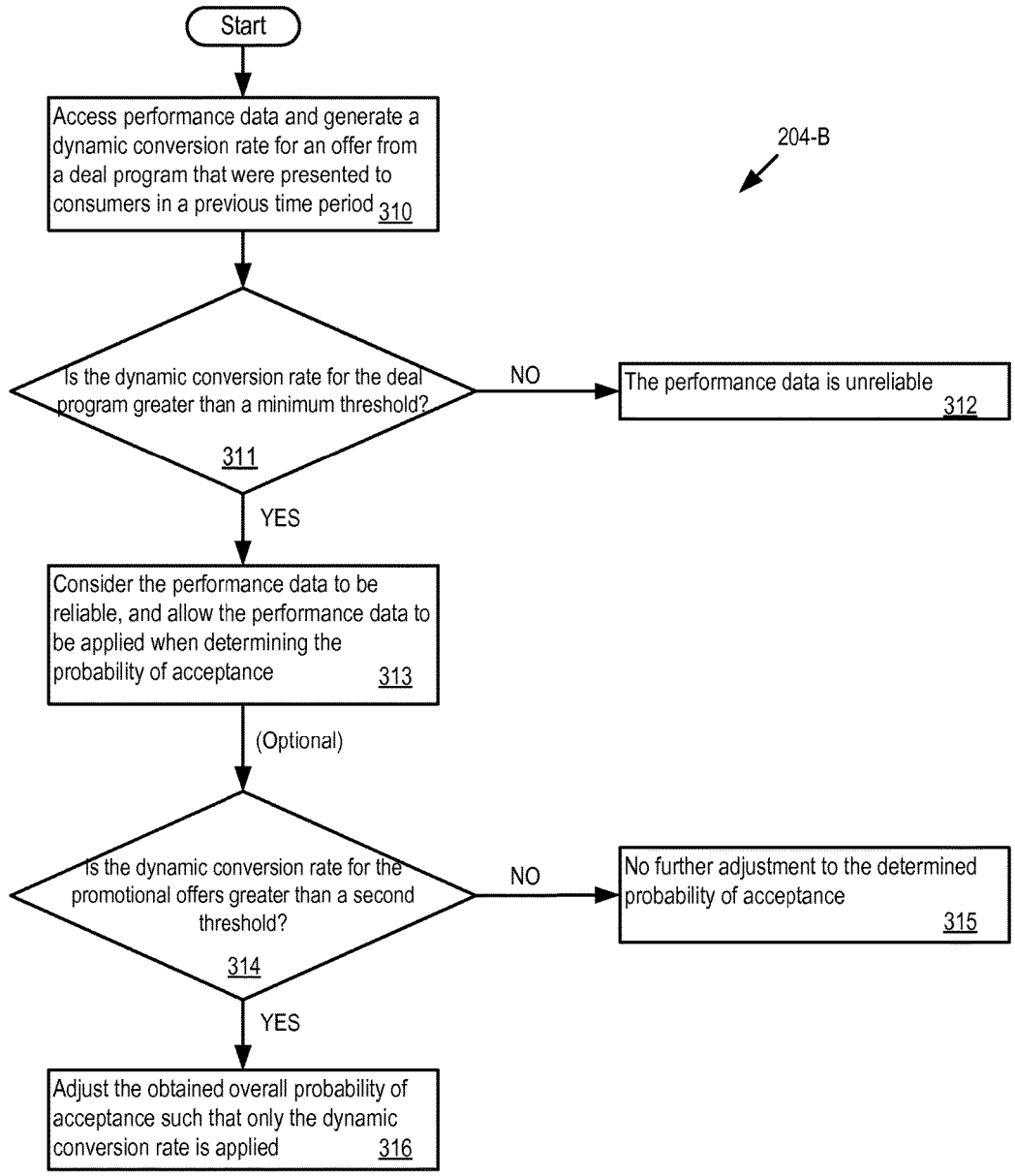
FIG. 3B illustrates an expanded flow chart describing another example to determine whether to use performance data for deal analytics.
Figure 3C:
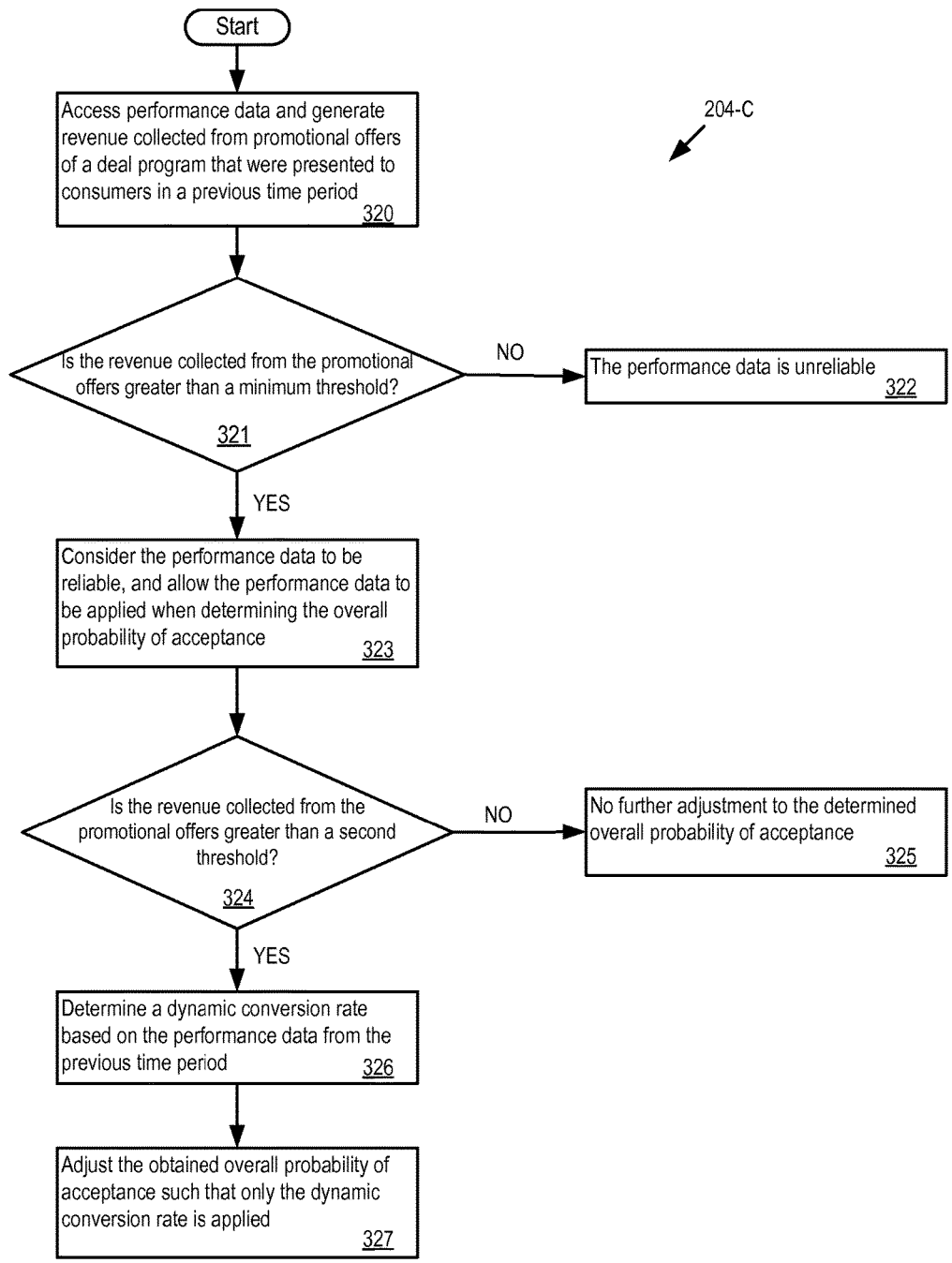
FIG. 3C illustrates an expanded flow chart describing still another example whether to use performance data for deal analytics.

At 204, a determination is optionally made whether to use the performance data pertaining to the specific promotion program. In the case where no performance data for the specific promotion program is available (e.g., it is currently the initial time period (e.g. launch day) for the specific promotion program), the process continues to 205. At 205, the probability of acceptance of the offer from the specific promotion program is determined to be based on the predicted conversion rate.

Where performance data on the particular promotion program exists from a previous time period, the performance data is analyzed, such as to determine a measure of reliability of the performance data. FIGS. 3A-3C describe different analytical measures of the reliability of the performance data gathered during a previous time period.

If it is determined that the performance data is to be used, at 206, a probability of acceptance of the offer from the specific promotion program is determined based on the predicted conversion rate and the performance data of the specific promotion program gathered in a previous time period.

As discussed above, the promotion program predictive model 106 may generate an indication of acceptance of the specific promotion program by the particular consumer using performance data of the specific promotion program from a previous time period. The output of the promotion program predictive model 106 may take one of several forms. For example, the output of the promotion program predictive model 106 may be a ratio of x/y, where x is the subset of acceptances for the attributes of the particular consumer (such as consumers who accepted that were 2-4 miles away from the promotion), and where y is the number of offers for the attributes of the particular consumer. As another example, the output of the promotion program predictive model 106 may be a combination of multiple expected conversion rates.

Regardless, the performance data for the specific promotion program may be limited. So that, it may be difficult to obtain a reliable indication of acceptance if the performance data is subdivided into multiple attributes. For example, if the attributes include a male consumer 2-4 miles away from the promotion location, the performance data may not be sufficient to examine the performance data to determine the results of consumers similarly situated (e.g., other male consumers 2-4 miles away from the promotion location).

As discussed above, in order to avoid an insufficient amount of performance data, the promotion program predictive model 106 may perform multiple analyses of the performance data. For example, the promotion program predictive model 106 may generate multiple indications of acceptance based on one or more analyses of the performance data. In particular, the performance data may be analyzed for one attribute (or one set of attributes), thereby generating a first indication of acceptance. The performance data may also be analyzed for another attribute (or another set of attributes), thereby generating a second indication of acceptance. As discussed above, attributes include, but are not limited to, gender of the consumer, distance of the consumer from the specific promotion program and a geographical direction of the consumer from the specific promotion program. In the example given above, the performance data may be analyzed with respect to male consumers (e.g., how did male consumers react to the promotion program) to generate a first indication, and the performance data may again be analyzed with respect to consumers 2-4 miles away from the promotion to generate a second indication. The two indications may be combined in order for the promotion program predictive model 106 to generate the indication of acceptance of the specific promotion.

For example, if the particular consumer is located 0-2 miles from the specific promotion program that is being evaluated, a first indication of acceptance may consider a dynamic conversion rate for all users at 0-2 miles from the specific promotion. If the distance attribute is the only attribute under consideration, the promotion program predictive model 106 uses the first indication of acceptance as the indication of acceptance of the specific promotion program. If additional attribute(s) are to be considered, additional analysis of the performance data with respect to the additional attributes is performed, with the output(s) being factored into the first indication of acceptance. For instance, if the gender of the particular consumer is further considered and the particular consumer is a male, the performance data may be examined to determine the dynamic conversion rate for males that accepted the specific promotion program in the previous time period. The dynamic conversion rate that considers the second attribute (male) may be a second indication of acceptance. In this way, the dynamic conversion rate of the specific promotion program for males in the previous time period is generated separately from the dynamic conversion rate of the specific promotion program for all users located a distance of 0-2 miles from the location of the specific promotion program. The two dynamic conversion rates based on the consumer's distance from the specific promotion program and consumer's gender are generated separately in order to preserve the pool of performance data from which the dynamic conversion rates rely on. So that, the dynamic conversion rates that are generated for each considered attribute (or each set of attributes) will be generated separately.

After the separate dynamic conversion rates that consider individual attributes (or different sets of attributes) have been generated, the separate dynamic conversion rates may be combined to generate a single dynamic conversion rate. For example, for the particular consumer that is a male, if it is found that men converted the specific promotion program at twice the rate of the overall population (i.e., considering both male and females), then the first indication of acceptance that is based on the distance attribute may be adjusted by a correction factor that is based on the gender attribute (such as multiplying the first indication of acceptance by 2 for the particular consumer).

As another example, considering the same particular consumer as above that is located 0-2 miles from the specific promotion program and taking the first indication of acceptance as discussed above, consider the example where a second attribute of the consumer is a direction (e.g., north, south, east, west) of the particular consumer from the specific promotion program. So that, after generating the first indication of acceptance for the particular consumer and the specific promotion program based on the particular consumer being located 0-2 miles away, a second indication of acceptance (such as a separate dynamic conversion rate) may be generated based on the direction of the particular consumer (such as the consumer being located north of the specific promotion program). The second indication of acceptance may be generated based on performance data from a previous time period of the specific promotion program that identified a percentage of all consumers that accepted the deal from the specific promotion program that are located north of the specific promotion program. After analyzing the first and second indication of acceptances, if it is found that consumers north of the specific promotion program converted at twice the rate of the overall population, the first indication of acceptance that is based on the distance attribute may be adjusted by a correction factor that is based on the geographical direction attribute (such as by multiplying the first indication of acceptance by 2 for the particular consumer that is located north of the specific promotion program). Thus, the promotion program predictive model 106 may generate an indication of acceptance of the specific promotion using multiple indications of acceptance.

As discussed above, the historical predictive model 108 is configured to output a prediction that the consumer will accept an offer for a promotion, with the prediction based on performance data from other promotion programs. The prediction from the historical predictive model 108 may be in one of several forms, such as a single number, a distribution of numbers, or the like. In particular, the predicted conversion rate may be represented by a distribution, which may reflect conversion rates for past promotion programs that share similar attributes as the specific promotion program. For example, the distribution may be based on performance data from a same or similar promotion program category/sub-category, price, distance, and/or other various attributes related to the particular consumer and the like. In one implementation, the output of the historical predictive model 108 is a distribution (D) with an average and a variance Generally speaking, the output of the historical predictive model 108 is an indicator of how the specific promotion program should perform vis-à-vis other similarly situated promotions. More specifically, the historical predictive model 108 is an indicator of what the distribution of conversion rates for this type of promotion program is. The output of the promotion program predictive model 106 is based on actual performance data from the promotion program (such as x conversions from y offers). The promotion offering system 102 is configured to use statistical calculations to determine a likely overall conversion rate given the distribution and the x conversions from y offers. Examples of general guidelines for the statistical calculations include: the overall probability is typically not x/y or the average of D; if y is very large (e.g., the amount of performance data for the specific promotion program is great), the overall probability is closer to x/y; if D has a small variance (e.g., the conversion rates for deals in the category/subcategory are similar), the overall probability is closer to the average of D; and if D has a large variance, (e.g., the conversion rates for deals in the category/subcategory are dissimilar), the overall probability is closer to x/y.

Given the general guidelines, the prediction from the promotion program predictive model 106 and from the historical predictive model 108 may be combined (such as statistically or mathematically combined). One type of combination is a Bayesian statistical combination. In particular, one may assume that the distribution D is a beta distribution. Bayesian statistics relies on the interpretation of probabilities, which in this case is the probability of a consumer accepting a deal offered from the specific promotion program. The Bayesian combination utilized relies on a dataset of distributions that describes a distribution of conversion rates for past promotion programs that share similar attributes as the specific promotion program, as described in further detail below.

Given an example where the selected distribution of conversion rates for similar past promotion programs is a beta distribution, two variables may be considered: alpha and beta. Beta distributions may be effectively utilized when relying on Bayesian statistical models, as is the current invention. The beta distribution is used to describe the distribution of an unknown probability value, which in this case is the use of the distribution of past conversion rates for promotion programs that are similar to the specific promotion program in order to determine a probability that the particular consumer will accept an offer from the specific promotion program.

So that, alpha and beta are fit to the score of the predictive analytical model and the variance of conversion rates that make up the score. Specifically, method of moments may be used for the distribution D. In statistics, the method of moments is a method of estimation of population parameters such as mean, variance, median, etc. (which need not be moments), by equating sample moments with unobservable population moments and then solving those equations for the quantities to be estimated. Thus, the method of moments may estimate a population of parameters, which in this case may be seen as the estimation for the predicted conversion rate from the beta distribution of previous conversion rates for similar promotion programs.

Given the beta distribution of the selected distribution, alpha/(alpha+beta)=score. Further, the most likely overall probability of acceptance may be represented by: (x+alpha)/(y+alpha+beta).

An example of the implementation is a specific promotion program belonging to the category of "Health and Beauty", and further the sub-category of "Skin Care & Facials". Given the above category and sub-category of the specific promotion program, assume 2992 offers were presented to consumers for similar promotion programs in a previous time period, (y). And assume that for those 2992 offers, 1 offer was actually accepted by a consumer, (x). Also assume an alpha value of 1.67, and a beta value of 1180. From this data set and assuming a beta distribution of past conversion rates, a most likely predicted conversion rate can be calculated according to the relationship of: (x+alpha)/(y+alpha+beta)=0.0006. This calculation for the likely predicted conversion rate can be seen to be different from if simply (x)/(y)=0.0003 were calculated. Then by referencing the calculated predicted conversion rate (0.0006), the score may be calculated according to: alpha/(alpha+beta)=0.0014. The standard deviation for this situation is 0.0011.

As another example, a specific promotion program may belong to the category of "Food & Drink", and further the sub-category of "Thai food". Given the above category and sub-category of the specific promotion program, assume 2991 offers were presented to consumers for similar promotion programs in a previous time period, (y). And assume that for those 2991 offers, 5 offers were actually accepted by a consumer, (x). Also assume an alpha value of 1.07, and a beta value of 267.5. From this data set and assuming a beta distribution of past conversion rates, a most likely predicted conversion rate can be calculated according to the relationship of: (x+alpha)/(y+alpha+beta)=0.00186. This calculation for the likely predicted conversion rate can be seen to be different from if simply (x)/(y)=0.00167 were calculated. Then by referencing the calculated predicted conversion rate (0.00186), the score may be calculated according to: alpha/(alpha+beta)=0.004. The standard deviation for this situation is 0.0038.

Alternatively, according to one embodiment, instead of referencing the performance data of the specific promotion program gathered from a previous time period to generate a dynamic conversion rate, the performance rate may be referenced to generate a correction factor that may be applied to the predicted conversion rate. The predicted conversion rate may be generated according to the disclosure above. The predicted conversion rate with the correction factor applied to it may then be used to determine the probability of acceptance of the promotion program offer by the consumer.

A value of the correction factor may be dependent upon the performance data that is gathered for the specific promotion program in the previous time period. In particular, the correction factor may be dependent upon a reliability of the performance data. A more detailed description for how the reliability of the performance data stored in the dynamic data database 116 is determined is provided below.

FIGS. 3A-3C illustrates flow charts determining a reliability of performance data gathered for a promotion program in a previous time period. Each of FIGS. 3A-3C are an expansion of the step 204 from FIG. 2, where a determination is made as to whether to use the performance data or not. FIGS. 3A-3C expands upon this point by correlating the decision to use the performance data to a determination as to the reliability of the performance data.

According to flow chart 204-A, performance data corresponding to the number of offers from a specific promotion program that were presented to consumers in a previous time period is obtained from the dynamic data database 116. This performance data is essentially the number of offers from the specific promotion program that were transmitted to consumers, or the number of impressions made.

At 302 a determination is made as to whether the number of offers from the specific promotion program that were sent out to consumers is greater than a minimum threshold amount. An example of the minimum threshold is 3000. Other minimum thresholds are contemplated. If the number of offers is not greater than the minimum threshold amount, then the performance data is considered to be unreliable at 303. Unreliable performance data need not be used or referenced. However, if the number of offers is greater than the minimum threshold amount, then the performance data may be considered to be reliable at 304, and the performance data may be used later when determining the probability that the consumer will accept the specific promotion program if offered. At 304, the probability of acceptance may be a prediction that takes into account both a predicted conversion rate and the performance data that was determined to be reliable.

Optionally, a second, higher, threshold may be utilized in determining whether the performance data is considered reliable. At 305, a second (optional) determination is made as to whether the number of offers sent out to consumers is greater than a second threshold. The second threshold may be greater than the previous minimum threshold referenced in 302.

If the number of offers from the specific promotion program transmitted to consumers in the previous time period is not greater than the second threshold amount, then at 306, it is seen that no further adjustments are made to the figure obtained for the probability of acceptance that the consumer accepts the offer from the specific promotion program described in 304.

However if the number of offers from the specific promotion program transmitted to consumers in the previous time period is found to be greater than the second threshold amount, then at 307 a dynamic conversion rate is generated based on the performance data that was found to be reliable. The description for how a dynamic conversion rate is generated is provided above. After a dynamic conversion rate is generated at 307, the probability of acceptance of the offer from the specific promotion program by the consumer may be adjusted to only rely on the dynamic conversion rate at 308. So unlike the probability of acceptance that is determined at 304 when the number of offers is found only to be greater than a minimum threshold where both a predicted conversion rate and performance data is relied on, when the number of offers is found to be greater than a second threshold value as in 307 only the dynamic conversion rate that is based on the reliable performance data may be relied on when determining the probability of acceptance. The adjustment made in 308 is taken into account during the determination made in 206 of flow chart 200.

According to the flow chart 204-B, performance data corresponding to the specific promotion program is referenced to generate a dynamic conversion rate at 310.

At 311, a determination is made as to whether the dynamic conversion rate is greater than a minimum threshold amount. If the dynamic conversion rate is not greater than the minimum threshold amount, then the performance data is considered to be unreliable at 312. Unreliable performance data is not used or referenced. However, if the dynamic conversion rate is greater than the minimum threshold amount, then the performance data may be considered to be reliable at 313, and the performance data may be used later when determining the probability that the consumer will accept the specific promotion program if offered. At 313, the probability of acceptance may be a prediction that takes into account both a predicted conversion rate and the performance data that was determined to be reliable.

Optionally, a second, higher, threshold may be utilized during the determination of whether the performance data may be considered reliable. At 314, a second (optional) determination is made as to whether the dynamic conversion rate is greater than a second threshold. The second threshold may be greater than the previous minimum threshold referenced in 311.

If the dynamic conversion rate of the specific promotion program in the previous time period is not greater than the second threshold amount, then at 315 it is seen that no further adjustments are made to the figure obtained for the probability of acceptance that the consumer accepts the offer from the specific promotion program described in 313.

However if the dynamic conversion rate is found to be greater than the second threshold amount, then at 316 the probability of acceptance of the offer from the specific promotion program by the consumer is adjusted to only rely on the dynamic conversion rate. So that, unlike the probability of acceptance that is determined at 313 when the dynamic conversion factor is found only to be greater than a minimum threshold where both a predicted conversion rate and performance data is relied on, when the dynamic conversion factor is greater than a second threshold value as in 316 only the dynamic conversion rate that is based on the reliable performance data will be relied on when determining the probability of acceptance. The adjustment made at 316 is taken into account during the determination made in 206 of flow chart 200.

According to the flow chart 204-C, performance data corresponding to the specific promotion program is referenced to generate information detailing revenue collected from the acceptance of the specific promotion program at 320.

At 321, a determination is made as to whether the revenue collected is greater than a minimum threshold amount. If the revenue collected is not greater than the minimum threshold amount, then the performance data is considered to be unreliable at 322. Unreliable performance data will not be used or referenced according to the present invention. However, if the revenue collected is greater than the minimum threshold amount, then the performance data may be considered to be reliable at 323, and the performance data may be used later when determining the probability that the consumer will accept the specific promotion program if offered. At 323, the probability of acceptance may be a prediction that takes into account both a predicted conversion rate and the performance data that was determined to be reliable.

Optionally, a second, higher, threshold may be utilized during the determination of whether the performance data may be considered reliable. At 324, a second (optional) determination is made as to whether the revenue collected is greater than a second threshold. The second threshold may be greater than the previous minimum threshold referenced in 321.

If the revenue collected of the specific promotion program in the previous time period is not greater than the second threshold amount, then at 325 it is seen that no further adjustments are made to the figure obtained for the probability of acceptance that the consumer accepts the offer from the specific promotion program described in 323.

However if the revenue collected is found to be greater than the second threshold amount, then at 326 a dynamic conversion rate based on the reliable performance data is generated. The description for how a dynamic conversion rate is generated is provided above. Then at 327 the probability of acceptance of the offer from the specific promotion program by the consumer is adjusted to only rely on the dynamic conversion rate. So unlike the probability of acceptance that is determined at 323 when the revenue collected is found only to be greater than a minimum threshold where both a predicted conversion rate and performance data is relied on, when the revenue collected is found to be greater than a second threshold value as in 326 only the dynamic conversion rate that is based on the reliable performance data will be relied on when determining the probability of acceptance. The adjustment made at 327 is taken into account during the determination made at 206 in the flow chart 200.

As previously described in detail above, performance data for a specific promotion program gathered from a previous time period may optionally be validated as being reliable before the performance data is used. One variable in determining the reliability of the performance data is the number of consumers that were presented with offers from the specific promotion program in the previous time period. The greater the number of consumers that were presented with the offer from the specific promotion program, the larger the data pool and therefore the more reliable the performance data. For example, a data pool that tracked the performance of a promotion program that was offered to 1000 consumers is considered more reliable than a promotion offer that was only offered to 10 consumers. This is because the larger data pool decreases the likelihood of outlying data corrupting the "normal" performance data.

In an attempt to increase the likelihood that the performance data for a promotion program is considered reliable, the promotion offering system 102 is configured to present offers for the promotion program to a minimum number of consumers in a given time period (such as the initial time period). The minimum number of consumers may correlate to a minimum threshold number to determine the performance data reliable (such as 3000, as discussed above).

Figure 4A:
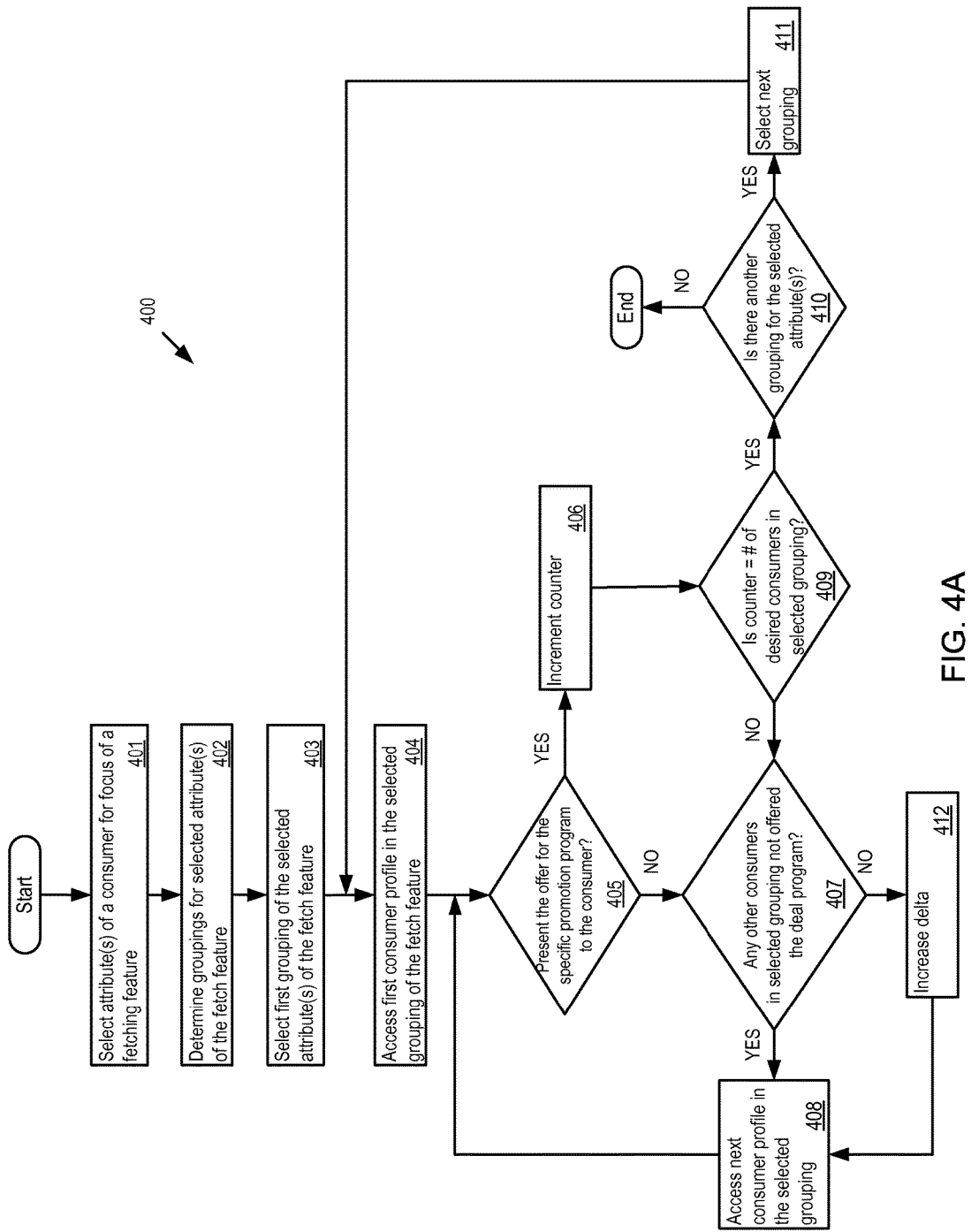
FIG. 4A illustrates a flow chart to determine which consumers to select in order to ensure a minimum number of consumers are presented with an offer from a promotion program.

FIG. 4A illustrates a flow chart 400 to determine which consumers to select in order to ensure a minimum number of consumers are presented with an offer from a promotion program.

At 401, an attribute of a consumer may be selected. For example, the attribute may correspond to a distance of the consumer from the specific promotion program.

At 402, groupings within the selected attribute may be determined. For example, if the attribute is a distance of the consumer from the specific promotion program, the groupings may be determined to be the intervals of 0-2 miles, 2-4 miles, 4-6 miles, 6-8 miles, and so on.

At 403, a grouping within the attribute may be further selected. For example, if the attribute is a distance of the consumer from the specific promotion program, a grouping that concentrates on a distance of 2-4 miles may be selected.

At 404, the consumer profiles database 112 is accessed to select a consumer profile that matches the criteria of the attribute selected at 401 and the grouping selected at 403.

At 405, a determination is made as to whether to present the selected consumer with an offer from the specific promotion program.

If it is determined that an offer is to be presented to the consumer, a counter is incremented at 406. Then at 409 a determination is made as to whether the counter is equal to the desired number of consumers in the selected grouping that are to be presented the offer from the specific promotion program. If it is determined at 409 that the counter is equal to the desired number of consumers in the selected grouping that are to be presented the offer from the specific promotion program, then the process will move on to 410. From 410, if there is another grouping to be selected, the next grouping will be selected at 411. Or else if there are no more groupings within the selected attribute to be selected, then the process will end at 410.

If it is determined that an offer from the specific promotion program is not to be made to the consumer at 405, or if it is determined at 409 that the counter is not equal to the desired number of consumers in the selected grouping that are to be presented the offer from the specific promotion program, then another determination is made at 407. The determination at 407 examines whether there are any other consumers to consider in the selected grouping that has not yet been offered the specific promotion program. If there are no consumers left in the grouping left to consider ("No" at block 407), at 412, the delta is increased. As discussed in more detail below in FIG. 4B (and discussed in U.S. Provisional Application 61/593,262, incorporated by reference herein in its entirety), the delta is a measure of whether to offer the pre-feature promotion to a consumer. If the consumer is outside of the delta, the consumer is not offered the pre-feature promotion. If there are not enough consumers that have been tagged to be offered the promotion, the delta may be increased, thereby increasing the number of consumers offered the pre-feature promotion. If at 407 it is found that consumers are left in the selected grouping that have not yet been considered for presentation of the offer from the promotion program, a next consumer profile within the selected grouping is accessed at 408 and the logic flow repeats again from 405.

Alternatively, without selecting a consumer attribute and grouping beforehand (such as at 401-403), flow chart 400 may be accomplished by ensuring that a minimum number of random consumers within the promotion program system 100 are presented with the offer from the particular promotion program. Or after selecting a consumer attribute, without selecting a specific grouping within the attribute, a minimum number of consumers anywhere within the attribute may be selected for being presented with the offer from the promotion program. Thus variations of the logic flow provided by the flow chart 400 illustrated in FIG. 4A are within the scope of the present invention as long as a minimum number of consumers are presented with the offer from the specific promotion program.

Figure 4B:
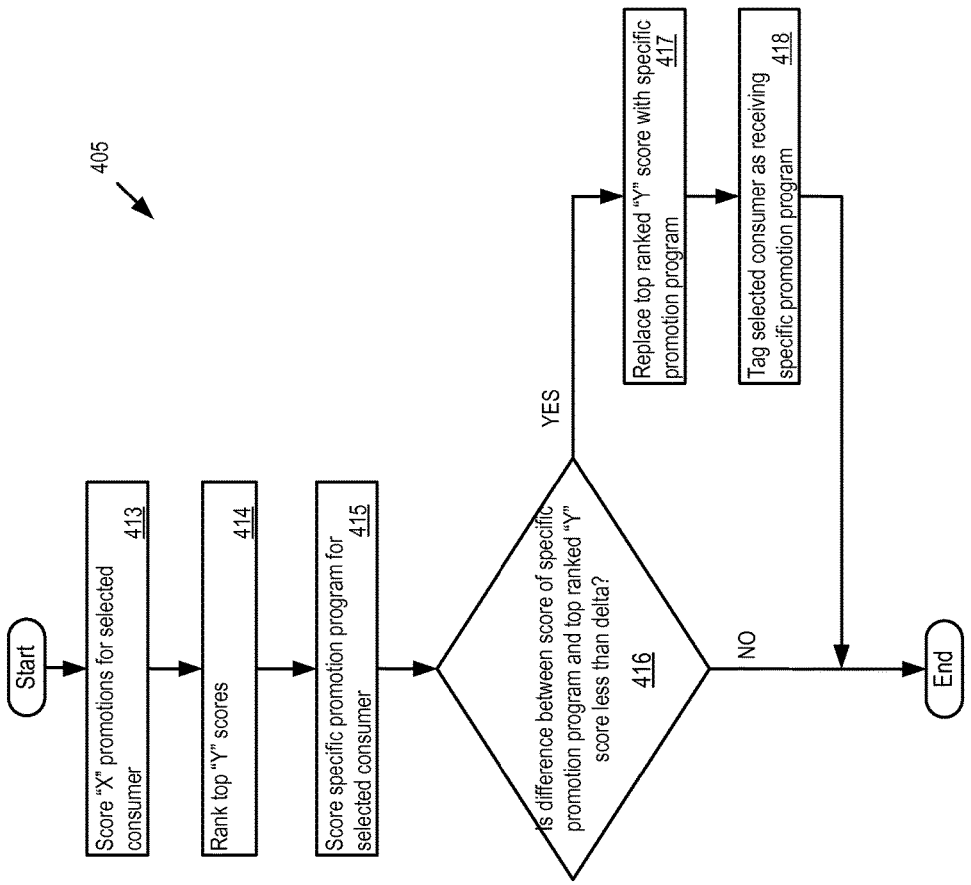
FIG. 4B illustrates a flow chart of a part of the logic flow of FIG. 4A.

FIG. 4B shows a logic flow of block 405 of the logic 400 in which a single specific promotion program is evaluated. At block 413, "X" promotions are scored for the selected consumer. The consumer may be offered promotions from multiple promotion programs, including the specific promotion program. The multiple promotion programs may be scored as a first step in determining which promotion(s) to offer to the consumer. The scoring may be based on historical data, such as: data gathered from the promotion program under consideration (if data has already been gathered on the promotion program under consideration); data gathered from promotion programs with similar attributes (such as similar locations, similar rewards, etc.); and data gathered from promotion promotions that the consumer has accepted or rejected. At 414, the top "Y" scores may be ranked. For example, if 20 full-feature promotions are scored, the top 5 full-feature promotions, according to score, may be ranked.

At 415, the specific promotion program for the selected consumer may be scored. Similar to the scoring of the other promotion programs, the scoring for the specific promotion program may be based on historical data, such as data gathered from other promotion programs with similar attributes and/or data gathered from promotions that the consumer has accepted or rejected. At 416, it is determined whether the difference between the score of the specific promotion program and the top ranked "Y" score is less than "delta". If the difference is less than delta, the ordering of the scores may be changed. For example, at 417, the top ranked "Y" score is replaced by the specific promotion program, and at 418, the selected consumer is tagged as receiving the specific promotion program.

The promotion offering system 102 may seek to offer the specific promotion program to consumers. However, the offer of the specific promotion program is made using "delta" in order to confirm that the offer is made to a consumer who is, within the "delta", considered likely to be interested in the promotion. As a general matter, the greater the "delta", the less likely the consumer may be interested when offered the pre-feature promotion. Conversely, the smaller the "delta", the more likely the consumer may be interested when offered the pre-feature promotion.

Figure 5:
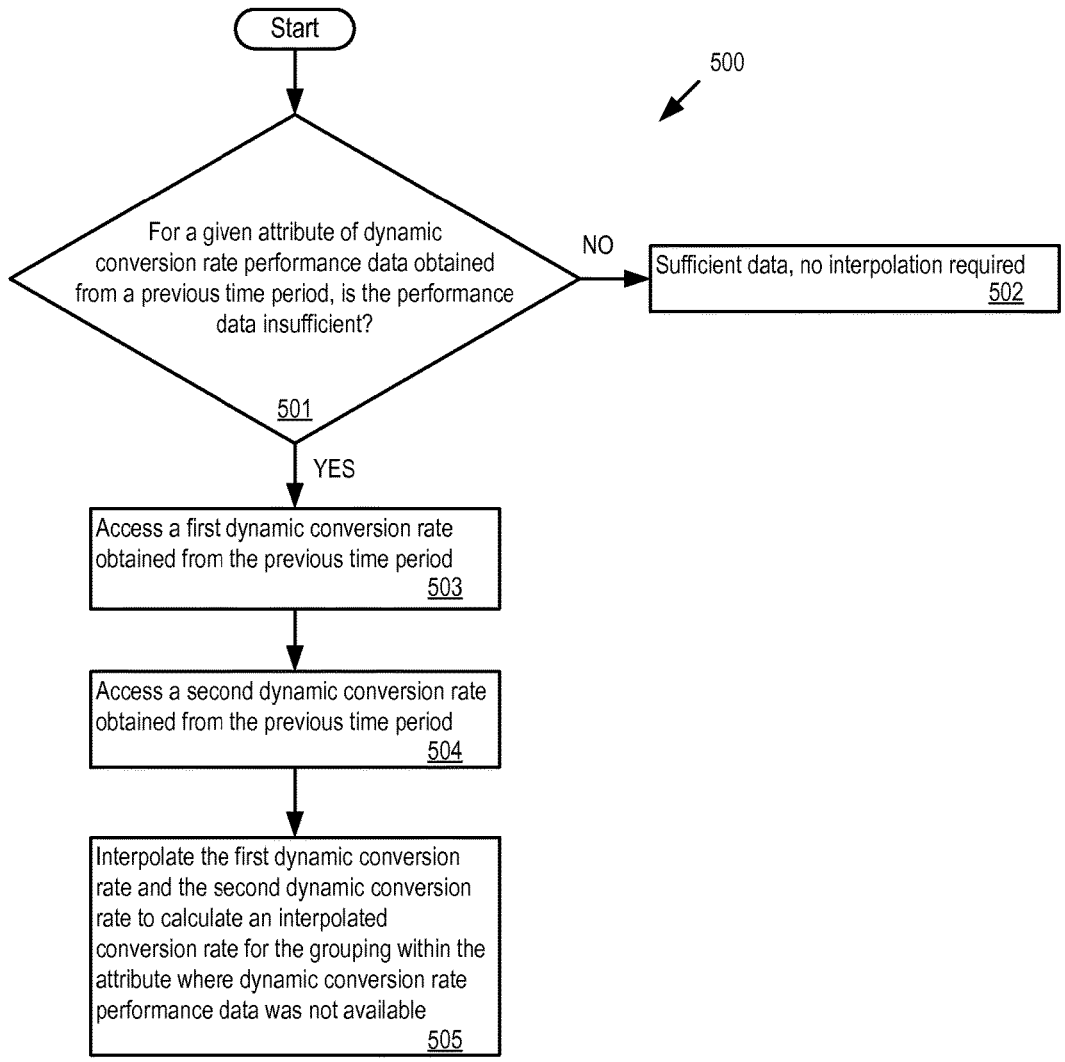
FIG. 5 illustrates a flow chart to determine whether and how to interpolate performance data.

FIG. 5 illustrates a flow chart 500 for generating estimated conversion rate data when the gathered performance data is insufficient. As discussed above, the performance data is generated for a specific promotion program. The performance data may be segmented based on one or more attributes, such as attributes of the promotion program, attributes of the consumer (e.g., gender), and/or attributes based on both the promotion program or consumer (such as distance between the consumer and the promotion location). After segmenting the performance data, there may be insufficient data. Table 1 in FIG. 6 illustrates an example in which the performance data from a previous time period for two different promotion programs are insufficient. The attribute in Table 1 is a distance of a consumer from the particular promotion program, and the attribute has been further specified into groupings of 0-2 miles, 2-4 miles, 4-6 miles, 6-8 miles, 8-10 miles, 10-12 miles, 12-14 miles, 14-16 miles and so on.

As shown in the example illustrated in FIG. 6, offers from the first promotion program were not presented to consumers (or were not presented to enough consumers) located at 4-6 and 12-14 miles from the promotion program. Therefore, the performance data may be insufficient for distances of 4-6 miles and 12-14 miles.

For the second promotion program, offers from the second promotion program were not presented to consumers located at 2-4, 8-10 and 12-14 miles from the second promotion program. Therefore dynamic conversion rates at distances of 2-4, 8-10 and 12-14 were not able to be generated.

In order to compensate for insufficient data, interpolation is used. The interpolation may be on the performance data itself, or on the results from analyzing the performance data (such as on the conversion rate that is determined by analyzing the performance data). For example, interpolation of known dynamic conversion rates may be used to generate interpolated conversion rates that are an estimation of what such conversion rates would have been in the gaps had consumers in those distance ranges been presented with offers from the respective promotion programs.

At 501, for a given attribute, it is determined whether the performance data is insufficient. One indication of insufficiency is whether there are any gaps in dynamic conversion rate data that was able to be generated from performance data for any attribute and grouping (e.g. distance of consumer from a promotion program, and distance range) that is available. If there are no gaps, then interpolation is not required as seen at 502.

If the performance data is insufficient, at 503 a first dynamic conversion rate is referenced. The first dynamic conversion rate is a dynamic conversion rate that has been generated based on gathered performance data from a previous time period. For example in Table 1, if the missing dynamic conversion rate is located at 4-6 miles for the first promotion program, the first dynamic conversion rate may be the dynamic conversion rate at 2-4 miles.

At 504, a second dynamic conversion rate is referenced. Following the same example where the missing dynamic conversion rate is located at 4-6 miles for the first promotion program, the second dynamic conversion rate may be the dynamic conversion rate at 6-8 miles.

At 505, the first dynamic conversion rate and the second dynamic conversion rate is interpolated to generate an interpolated conversion rate for the missing grouping. In the same example above, the first dynamic conversion rate at 2-4 miles may be interpolated with the second dynamic conversion rate at 6-8 miles to obtain the estimated interpolated conversion rate for the missing dynamic conversion rate at 4-6 miles.

Alternatively, instead of a missing dynamic conversion rate, interpolation may be performed whether or not the performance data is considered sufficient. As illustrated in Table 1, the data is segmented into ranges. Interpolation may be performed within one of the ranges. For example, a distance range may be 6-8 miles. If the distance of the consumer to the place of the promotion is 7.5 miles, the consumer falls within the designated 6-8 miles range. An interpolation may be performed, using values from multiple ranges. In particular, when the distance falls within a particular range, another range may be selected that is closer to the distance. In the example of 7.5 mile distance, the particular range is 6-8 miles. The other range selected closer to the distance is 8-10 miles. So that, the values from each of the ranges (the 6-8 mile range and the 8-10 mile range) are weighted. In this instance, because the distance is within the 6-8 mile range, the value from the 6-8 mile range is given more weight than the value from the 8-10 mile range. As another example, the consumer is 8.00 miles from the promotion program. The ranges, as shown are 6-8 miles and 8-10 miles. In this example, the predicted conversion rate may be generated using interpolation with the conversion rates for 6-8 miles and 8-10 miles (such as with equal weighting for the values from both ranges).

In this case, at 503 a first dynamic conversion rate that is referenced may correspond to the dynamic conversion rate at 6-8 miles for the first promotion program.

Then at 504, a second dynamic conversion rate is referenced may correspond to the dynamic conversion rate at 8-10 miles for the first promotion program.

At 505, the first dynamic conversion rate and the second dynamic conversion rate is interpolated to generate an interpolated conversion rate for the insufficient grouping, which in this case is for a consumer located 8 miles from the first promotion program.

When interpolating the first and second dynamic conversion rates, a weighting function may also be applied. For instance if the insufficient performance data was for a consumer located 6.5 miles from the first promotion program, the first dynamic conversion rate for the distance range 6.5 miles may be given a higher weighting value during an interpolation of two known dynamic conversion rates because the consumer is located within the distance range of the first dynamic conversion rate.

When referencing known dynamic conversion rates to generate an interpolated conversion rate estimation for a missing dynamic conversion rate, it is preferable to reference dynamic conversion rates that neighbor the missing dynamic conversion rate.

Figure 7A:
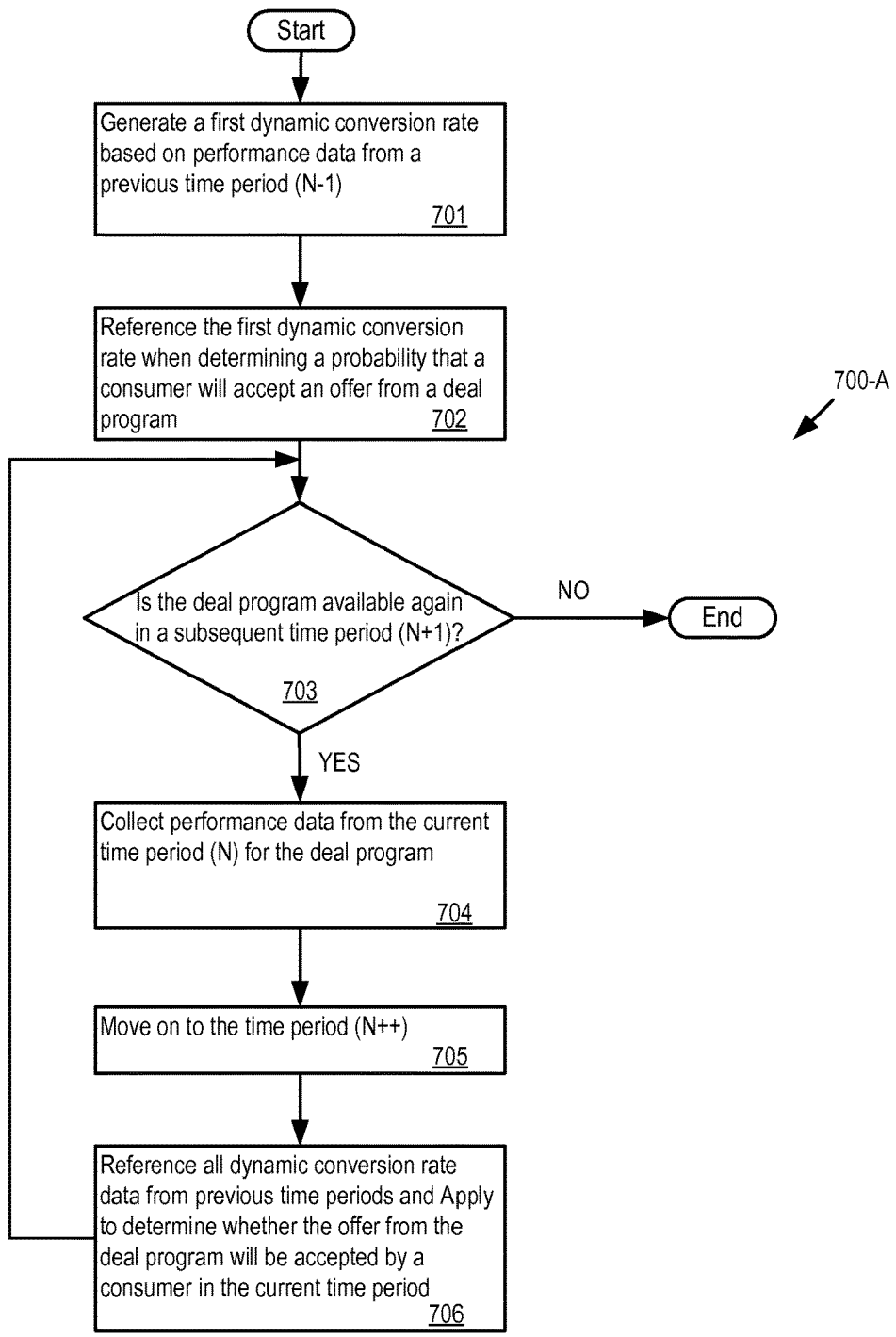
FIG. 7A illustrates a flow chart in which subsequent days of performance data are referenced when determining a probability of acceptance.
Figure 7B:
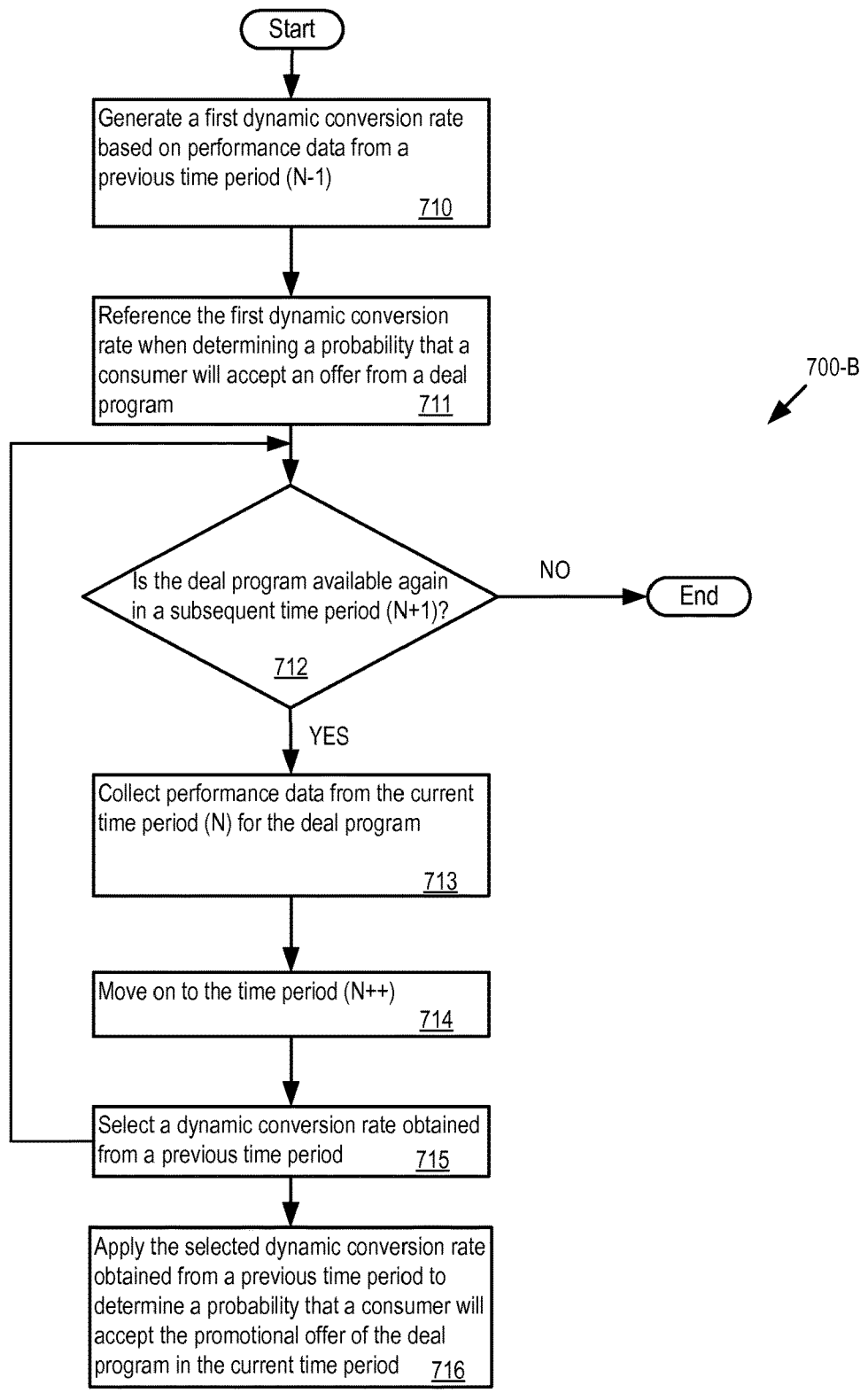
FIG. 7B illustrates a flow chart in which subsequent days of performance data are referenced when determining a probability of acceptance.

In some situations, a promotion program may be offered in multiple time periods. In such situations, a promotion program provider may have access to performance data of the promotion program from more than one time period. FIGS. 7A and 7B illustrate flow charts that describe two methods for dealing with reliable performance data from more than one time period.

FIG. 7A illustrates a flow chart 700-A that describes a process for handling reliable performance data of a promotion program that is made available from more than one time period. The following description will be made assuming the current time period is time period N.

At 701 a first dynamic conversion rate is generated based on performance data of a promotion program from a previous time period (N−1).

At 702, the first dynamic conversion rate will be referenced when determining a probability that a consumer will accept an offer from a promotion program, where the promotion program is the same promotion program from which the performance data is derived from in 701.

At 703, a determination is made as to whether the same promotion program is made available (i.e. offered) in a subsequent time period (N+1). If the promotion program is not offered in a subsequent time period, then the process is seen to end. However if the promotion program is determined to be offered in a subsequent time period, then the performance data from the current time period (N) should be gathered for later use.

At 704 the performance data from the current time period (N) is gathered and referenced when generating a dynamic conversion rate for the current time period.

Then at 705 the time period is moved on to the subsequent time period (N++).

At 706, on the subsequent time period all previously determined dynamic conversion rates may be referenced when determining whether the offer from the promotion program will be accepted by the consumer in the now current time period at 706.

FIG. 7B illustrates a flow chart 700-B that describes a process according to some embodiments of the present invention for handling reliable performance data of a promotion program that is made available from more than one time period. The following description will be made assuming the current time period is time period N.

At 710 a first dynamic conversion rate is generated based on performance data of a promotion program from a previous time period (N−1).

At 711, the first dynamic conversion rate will be referenced when determining a probability that a consumer will accept an offer from a promotion program, where the promotion program is the same promotion program from which the performance data is derived from in 710.

At 712, a determination is made as to whether the same promotion program is made available (i.e. offered) in a subsequent time period (N+1). If the promotion program is not offered in a subsequent time period, then the process is seen to end. However if the promotion program is determined to be offered in a subsequent time period, then the performance data from the current time period (N) should be gathered for later use.

At 713 the performance data from the current time period (N) is gathered and referenced when generating a dynamic conversion rate for the current time period.

Then at 714 the time period is moved on to the subsequent time period (N++).

Then at 715 one dynamic conversion rate from any available previous time period is selected.

At 716, on the subsequent time period the selected dynamic conversion rate may be referenced when determining whether the offer from the promotion program will be accepted by the consumer in the now current time period at 716.

Figure 8:
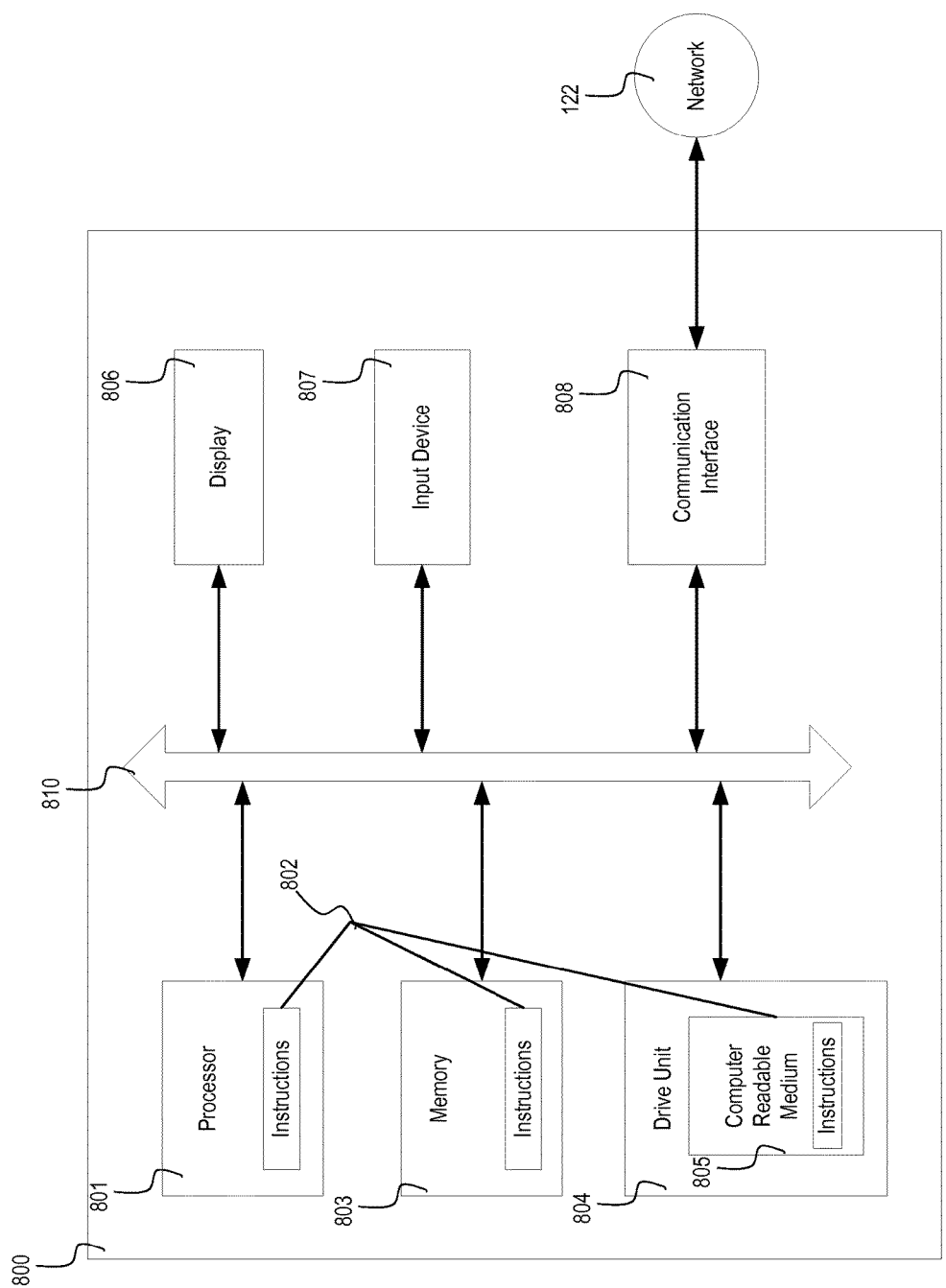
FIG. 8 is a general computer system, programmable to be a specific computer system, which may represent any of the computing devices referenced herein.

FIG. 8 illustrates a general computer system 800, programmable to be a specific computer system 800, which can represent any server, computer or component, such as consumer 1 (124), consumer N (126), merchant 1 (118), merchant M (120), promotion offering system 102, promotion program predictive model 106, and historical predictive model 108. The computer system 800 may include an ordered listing of a set of instructions 802 that may be executed to cause the computer system 800 to perform any one or more of the methods or computer-based functions disclosed herein. The computer system 800 can operate as a stand-alone device or can be connected, e.g., using the network 122, to other computer systems or peripheral devices.

In a networked deployment, the computer system 800 can operate in the capacity of a server or as a client-user computer in a server-client user network environment, or as a peer computer system in a peer-to-peer (or distributed) network environment. The computer system 800 may also be implemented as or incorporated into various devices, such as a personal computer or a mobile computing device capable of executing a set of instructions 802 that specify actions to be taken by that machine, including and not limited to, accessing the Internet or Web through any form of browser. Further, each of the systems described can include any collection of sub-systems that individually or jointly execute a set, or multiple sets, of instructions to perform one or more computer functions.

The computer system 800 can include a memory 803 on a bus 810 for communicating information. Code operable to cause the computer system to perform any of the acts or operations described herein can be stored in the memory 803. The memory 803 may be a random-access memory, read-only memory, programmable memory, hard disk drive or any other type of volatile or non-volatile memory or storage device.

The computer system 800 can include a processor 801, such as a central processing unit (CPU) and/or a graphics processing unit (GPU). The processor 801 may include one or more general processors, digital signal processors, application specific integrated circuits, field programmable gate arrays, digital circuits, optical circuits, analog circuits, combinations thereof, or other now known or later-developed devices for analyzing and processing data. The processor 801 may implement the set of instructions 802 or other software program, such as manually programmed or computer-generated code for implementing logical functions. The logical function or any system element described can, among other functions, process and convert an analog data source such as an analog electrical, audio, or video signal, or a combination thereof, to a digital data source for audiovisual purposes or other digital processing purposes such as for compatibility for computer processing.

The computer system 800 can also include a disk or optical drive unit 804. The disk drive unit 804 may include a computer-readable medium 805 in which one or more sets of instructions 802, e.g., software, may be embedded. Further, the instructions 802 may perform one or more of the operations as described herein. The instructions 802 may reside completely, or at least partially, within the memory 803 or within the processor 801 during execution by the computer system 800. Accordingly, the databases 110, 112, 114, or 116 may be stored in the memory 803 or the disk unit 804.

The memory 803 and the processor 801 also may include computer-readable media as discussed above. A "computer-readable medium," "computer-readable storage medium," "machine readable medium," "propagated-signal medium," or "signal-bearing medium" may include any device that has, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 800 may include an input device 807, such as a keyboard or mouse, configured for a user to interact with any of the components of system 800. It may further include a display 806, such as a liquid crystal display (LCD), a cathode ray tube (CRT), or any other display suitable for conveying information. The display 806 may act as an interface for the user to see the functioning of the processor 801, or specifically as an interface with the software stored in the memory 803 or the drive unit 804.

The computer system 800 may include a communication interface 808 that enables communications via the communications network 122. The network 122 may include wired networks, wireless networks, or combinations thereof. The communication interface 808 network may enable communications via any number of communication standards, such as 802.11, 802.17, 802.20, WiMax, 802.15.4, cellular telephone standards, or other communication standards, as discussed above. Simply because one of these standards is listed does not mean any one is preferred.

Further, the promotion offering system 102, as depicted in FIG. 1 may comprise one computer system or multiple computer systems. Further, the flow diagrams illustrated in FIGS. 2-7B may use computer readable instructions that are executed by one or more processors in order to implement the functionality disclosed.

The present disclosure contemplates a computer-readable medium that includes instructions or receives and executes instructions responsive to a propagated signal, so that a device connected to a network can communicate voice, video, audio, images or any other data over the network. Further, the instructions can be transmitted or received over the network via a communication interface. The communication interface can be a part of the processor or can be a separate component. The communication interface can be created in software or can be a physical connection in hardware. The communication interface can be configured to connect with a network, external media, the display, or any other components in system, or combinations thereof. The connection with the network can be a physical connection, such as a wired Ethernet connection or can be established wirelessly as discussed below. In the case of a service provider server, the service provider server can communicate with users through the communication interface.

The computer-readable medium can be a single medium, or the computer-readable medium can be a single medium or multiple media, such as a centralized or distributed database, or associated caches and servers that store one or more sets of instructions. The term "computer-readable medium" can also include any medium that can be capable of storing, encoding or carrying a set of instructions for execution by a processor or that can cause a computer system to perform any one or more of the methods or operations disclosed herein.

The computer-readable medium can include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium is preferably a tangible storage medium. Accordingly, the disclosure may be considered to include any one or more of a computer-readable medium or a distribution medium and other equivalents and successor media, in which data or instructions can be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and cannot be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A system for providing an offer, from a promotion program, to a consumer, utilizing an iteratively dynamically updated predictive model, by both (i) determining that an amount of performance data meets a reliability threshold and (ii) determining that each of two separate attributes of the promotion meet acceptance thresholds by determining a predicted probability that a consumer will accept an offer from the promotion program, the promotion program including a promotion program duration comprising a first period during which first period offers are issued and a second period during which second period offers are issued, the second period being subsequent in time to the first period, during which offers from the promotion program are presented, the system comprising:

one or more memories configured to store one or more consumer profiles, promotion program data of offers relating to the promotion program, and historical data of offers relating to different promotion programs;

and a processor in communication with the one or more memories, the processor configured to:

receive a first attribute value of a first attribute and a second attribute value of a second attribute, each attribute comprising or derived from a consumer attribute or a promotion attribute;

generate a historical predicted probability that a particular consumer will accept a particular offer from the promotion program, using a historical predictive model, the historical predictive model is configured to output the historical predicted probability based on performance data from one or more different promotion programs, wherein generating the historical predicted probability comprises:

correlating the first attribute value and the second attribute value to historical predicted acceptances of offers derived from performance data of offers from the one or more different promotion programs;

generate a program promotion predicted probability that the particular consumer will accept the particular offer using a promotion program predictive model, the promotion program predictive model is configured to output the program promotion predicted probability based on actual performance data from the promotion program, wherein generating the promotion program predicted probability comprises:

determining a first program promotion predicted probability value, the first program promotion predicted probability value correlated to previous program promotions having values of the first attribute that satisfy the first attribute value;

determining a second program promotion predicted probability value, the second program promotion predicted probability value correlated to previous program promotions having values of the second attribute that satisfy the second attribute value;

generating the program promotion predicted probability value based on the first program promotion predicted probability value and the second program promotion predicted probability value;

and dynamically updating the promotion program predictive model at multiple discrete times during the promotion program duration by at least one of: updating the promotion program predictive model to account for first period offers outstanding during the first period and accepted during the second period;

and updating the promotion program predictive model to account for second period offers accepted during the second offer period;

determine whether an amount of performance data is greater than a minimum threshold amount;

in an instance in which the determination is made that the amount of performance data is not greater than the minimum threshold, calculate a final predicted probability that the particular consumer will accept the particular offer to be a function of only the historical predicted probability while disregarding the promotion program predicted probability;

calculate whether the amount of performance data is greater than a second minimum threshold in an instance in which the amount of performance data is greater than the minimum threshold;

in an instance in which the amount of performance data is greater than the minimum threshold and is greater than the second minimum threshold, calculate the final predicted probability that the particular consumer will accept the particular offer to be a function of only the promotion program predicted probability while disregarding the historical predicted probability;

in an instance in which the amount of performance data is greater than the minimum threshold and is not greater than the second minimum threshold, calculate the final predicted probability that the particular consumer will accept the particular offer to be a function of both the promotion program predicted probability and the historical predicted probability;

determine that the final predicted probability that the particular consumer will accept the particular offer is within a predefined delta;

and provide, for display via a real-time webpage content presentation, the particular offer from the promotion program.

2. The system of claim 1, wherein the performance data includes one or both of a number of consumers that accepted the offer from the promotion program in the previous time period or a percentage of consumers that accepted the offer from the promotion program.

3. The system of claim 1, wherein the promotion program duration comprises a first period during which first period offers are issued and a second period during which second period offers are issued, the second period being subsequent in time to the first period; and wherein the processor is further configured to adjust, based on at least one of price of the offer and first period offers outstanding during the second period, the performance data to generate adjusted performance data.

4. The system of claim 1, wherein the performance data is indicative of a number of consumers with the accessed attribute that received the offer from the promotion;

and wherein the processor is configured to determine whether the performance data is insufficient comprises comparing the number of consumers with the selected attribute to a predetermined number.

5. The system of claim 1, wherein the processor is configured to combine the promotion program predicted acceptance for a different value than the first attribute value with the promotion program predicted acceptance for the first attribute value of the first attribute by:

accessing the promotion program predicted acceptance for the different value of the attribute;

selecting a correction factor based on a comparison of the received value of the attribute with the different value of the attribute;

applying the correction factor to the promotion program predicted acceptance for the different value of the attribute in order to generate a corrected promotion program predicted acceptance;

and combining the corrected promotion program predicted acceptance with the promotion program predicted acceptance.

6. The system of claim 5, wherein the received attribute comprises a selected position in the electronic communication;

wherein the different value of the attribute comprises a different position from the selected position;

and wherein the processor is configured to select a correction factor comprises selecting the correction factor based on a difference between the selected position and the different position.

7. The system of claim 1, wherein receiving a value of an attribute comprises values for a set of attributes;

wherein the processor is further configured to determine whether the performance data, used to correlate the received values for the set of attributes to the promotion program predicted acceptance, is insufficient.

8. The system of claim 1, wherein the processor is further configured to determine a confidence level for the program promotion predicted probability;

and wherein the processor is configured to combine the historical predicted probability and the promotion program predicted probability by:

selecting a correction factor based on the confidence level;

applying the correction factor to the promotion program predicted probability of acceptance to generate a weighted promotion program predicted probability of acceptance;

and combining the historical predicted probability of acceptance with the weighted promotion program predicted probability of acceptance.

9. A computer program product, stored on a non-transitory computer readable medium, comprising instructions that when executed on one or more computers cause the one or more computers to perform operations for providing an offer, from a promotion program, to a consumer, utilizing an iteratively dynamically updated predictive model, by both (i) determining that an amount of performance data meets a reliability threshold and (ii) determining that each of two separate attributes of the promotion meet acceptance thresholds by determining a predicted probability that a consumer will accept an offer from the promotion program, the promotion program including a promotion program duration comprising a first period during which first period offers are issued and a second period during which second period offers are issued, the second period being subsequent in time to the first period, during which offers from the promotion program are presented, the operations comprising:

receiving a first attribute value of a first attribute and a second attribute value of a second attribute, each attribute, the attribute comprising or derived from a consumer attribute or a promotion attribute;

generating, using a historical predictive model, a historical predicted probability that a particular consumer will accept a particular offer from the promotion program, the historical predictive model is configured to output the historical predicted probability based on performance data from one or more different promotion programs, wherein generating the historical predicted probability comprises: correlating the first attribute value and the second attribute value to historical predicted acceptances of offers derived from performance data of offers from the one or more different promotion programs;

generating, using a promotion program predictive model, a promotion program predicted probability that the particular consumer will accept the particular offer, the promotion program predictive model is configured to output the program promotion predicted probability based on actual performance data from the promotion program, wherein generating the promotion program predicted probability comprises:

determining a first program promotion predicted probability value, the first program promotion predicted probability value correlated to previous program promotions having values of the first attribute that satisfy the first attribute value;

determining a second program promotion predicted probability value, the second program promotion predicted probability value correlated to previous program promotions having values of the second attribute that satisfy the second attribute value;

and generating the program promotion predicted probability value based on the first program promotion predicted probability value and the second program promotion predicted probability value;

and dynamically updating the promotion program predictive model at multiple discrete times during the promotion program duration by at least one of:

updating the promotion program predictive model to account for first period offers outstanding during the first period and accepted during the second period;

and updating the promotion program predictive model to account for second period offers accepted during the second offer period;

determining whether an amount of performance data is greater than a minimum threshold amount;

in an instance in which the determination is made that the amount of performance data is not greater than the minimum threshold, calculating a final predicted probability that the particular consumer will accept the particular offer to be a function of only the historical predicted probability while disregarding the promotion program predicted probability;

calculating whether the amount of performance data is greater than a second minimum threshold in an instance in which the amount of performance data is greater than the minimum threshold;

in an instance in which the amount of performance data is greater than the minimum threshold and is greater than the second minimum threshold, calculating the final predicted probability that the particular consumer will accept the particular offer to be a function of only the promotion program predicted probability while disregarding the historical predicted probability;

in an instance in which the amount of performance data is greater than the minimum threshold and is not greater than the second minimum threshold, calculating the final predicted probability that the particular consumer will accept the particular offer to be a function of both the promotion program predicted probability and the historical predicted probability;

determining that the final predicted probability that the particular consumer will accept the particular offer is within a predefined delta;

and providing, for display via a real-time webpage content presentation, the particular offer from the promotion program.

10. The computer program product of claim 9, wherein the performance data includes one or both of a number of consumers that accepted the offer from the promotion program in the previous time period and a percentage of consumers that accepted the offer from the promotion program.

11. The computer program product of claim 9, wherein the promotion program duration comprises a first period during which first period offers are issued and a second period during which second period offers are issued, the second period being subsequent in time to the first period, the computer program product further comprising: adjusting, based on at least one of price of the offer and first period offers outstanding during the second period, the performance data to generate adjusted performance data.

12. The computer program product of claim 9, wherein the performance data is indicative of a number of consumers with the accessed attribute that received the offer from the promotion;

and wherein determining whether the performance data is insufficient comprises comparing the number of consumers with the selected attribute to a predetermined number.

13. The computer program product of claim 9, wherein combining the promotion program predicted acceptance for a different value than the first attribute value with the promotion program predicted acceptance for the first attribute value of the first attribute comprises:

accessing the promotion program predicted acceptance for the different value of the attribute;

selecting a correction factor based on a comparison of the received value of the attribute with the different value of the attribute;

applying the correction factor to the promotion program predicted acceptance for the different value of the attribute in order to generate a corrected promotion program predicted acceptance;

and combining the corrected promotion program predicted acceptance with the promotion program predicted acceptance.

14. The computer program product of claim 13, wherein the accessed attribute comprises a selected position in the electronic communication;

wherein the different value of the attribute comprises a different position from the selected position;

and wherein selecting a correction factor comprises selecting the correction factor based on a difference between the selected position and the different position.

15. The computer program product of claim 9, wherein the received value of the attribute comprises values for a set of attributes the operations further comprising: determining whether the performance data, used to correlate the values for the set of attributes to the promotion program predicted acceptance, is insufficient.

16. The computer program product of claim 9, the operations further comprising determining a confidence level for the promotion program predicted probability;

and wherein combining the historical predicted probability of acceptance and the promotion program predicted probability comprises: selecting a correction factor based on the confidence level;

applying the correction factor to the promotion program predicted probability of acceptance to generate a weighted promotion program predicted probability of acceptance;

and combining the historical predicted probability of acceptance with the weighted promotion program predicted probability of acceptance.

* * * * *